(12) United States Patent
Fantinel et al.

(10) Patent No.: US 8,846,188 B2
(45) Date of Patent: Sep. 30, 2014

(54) IMPACT RESISTANT LLDPE COMPOSITION AND FILMS MADE THEREOF

(75) Inventors: Fabiana Fantinel, Frankfurt (DE); Gerd Mannebach, Münstermaifeld (DE); Shahram Mihan, Bad Soden (DE); Gerhardus Meier, Frankfurt (DE); Iakovos Vittorias, Mainz (DE)

(73) Assignee: Basell Polioefine GmbH, Wesseling (DE)

(*) Notice: Subject to any disclaimer, the term of this patent is extended or adjusted under 35 U.S.C. 154(b) by 186 days.

(21) Appl. No.: 13/119,655

(22) PCT Filed: Sep. 22, 2009

(86) PCT No.: PCT/EP2009/006981
§ 371 (c)(1),
(2), (4) Date: May 27, 2011

(87) PCT Pub. No.: WO2010/034520
PCT Pub. Date: Apr. 1, 2010

(65) Prior Publication Data
US 2011/0223406 A1 Sep. 15, 2011

Related U.S. Application Data

(60) Provisional application No. 61/195,128, filed on Oct. 3, 2008.

(30) Foreign Application Priority Data

Sep. 25, 2008 (EP) .................... 08016861

(51) Int. Cl.
*B32B 3/00* (2006.01)
*C08F 210/14* (2006.01)
*C08F 4/72* (2006.01)
*C08F 4/80* (2006.01)
*C08L 23/20* (2006.01)
*B01J 31/12* (2006.01)

(52) U.S. Cl.
USPC ........ 428/220; 526/348.5; 526/170; 526/113; 526/117; 525/55; 502/102

(58) Field of Classification Search
USPC ................ 526/113, 348.5, 170, 117; 525/55; 502/102
See application file for complete search history.

(56) References Cited

U.S. PATENT DOCUMENTS

| 3,125,547 A | 3/1964 | Blatz |
| 3,862,265 A | 1/1975 | Steinkamp et al. |

(Continued)

FOREIGN PATENT DOCUMENTS

| CA | 2262493 | 9/1998 |
| EP | 129368 | 12/1984 |

(Continued)

OTHER PUBLICATIONS

Peacock, Andrew J., "Handbook of Polyethylene", Exxon Chemical Company, Baytown, Texas Marcel Dekker Inc., New York/Basel 2000, 7-10.

(Continued)

*Primary Examiner* — Ling Choi
*Assistant Examiner* — Catherine S Branch

(57) ABSTRACT

A novel PE material is devised showing excellent mechanical/optical properties and process ability, e.g. for film extrusion. The polyethylene of the invention is produced in one single e.g. gas phase reactor.

47 Claims, 4 Drawing Sheets

(56) References Cited

U.S. PATENT DOCUMENTS

| | | | |
|---|---|---|---|
| 3,922,322 | A | 11/1975 | Roger et al. |
| 3,953,655 | A | 4/1976 | Steinkamp et al. |
| 4,001,172 | A | 1/1977 | Steinkamp et al. |
| 4,921,825 | A | 5/1990 | Kioka et al. |
| 5,008,204 | A | 4/1991 | Stehling |
| 5,026,798 | A | 6/1991 | Canich et al. |
| 5,283,278 | A | 2/1994 | Daire |
| 5,352,749 | A | 10/1994 | DeChellis et al. |
| 5,420,220 | A | 5/1995 | Cheruvu et al. |
| 5,565,534 | A | 10/1996 | Aulbach |
| 5,840,644 | A | 11/1998 | Kuber et al. |
| 5,929,264 | A | 7/1999 | Rohrmann et al. |
| 5,990,254 | A | 11/1999 | Weller et al. |
| 6,069,213 | A | 5/2000 | Nemzek et al. |
| 6,417,302 | B1 | 7/2002 | Bohnen |
| 6,433,110 | B1 | 8/2002 | Lynch et al. |
| 6,642,339 | B1 | 11/2003 | Chai et al. |
| 6,657,026 | B1 | 12/2003 | Kimberley |
| 6,812,185 | B2 | 11/2004 | Fischer et al. |
| 6,870,010 | B1 | 3/2005 | Lue et al. |
| 6,878,454 | B1 | 4/2005 | Shannon |
| 7,141,632 | B2 | 11/2006 | Vaughan et al. |
| 2002/0058584 | A1 | 5/2002 | Bennett |
| 2004/0034179 | A1 | 2/2004 | Loveday et al. |
| 2004/0132933 | A1 | 7/2004 | Crowther |
| 2007/0010626 | A1 | 1/2007 | Shankernarayanan |
| 2007/0213205 | A1* | 9/2007 | Mihan ........................... 502/113 |
| 2007/0255033 | A1* | 11/2007 | Kipke et al. .................. 526/352 |
| 2008/0286509 | A1 | 11/2008 | Kipke et al. |
| 2011/0212283 | A1 | 9/2011 | Fantinel et al. |
| 2011/0212315 | A1 | 9/2011 | Fantinel et al. |

FOREIGN PATENT DOCUMENTS

| | | |
|---|---|---|
| EP | 279863 | 8/1988 |
| EP | 0416815 | 3/1991 |
| EP | 0545304 | 6/1993 |
| EP | 0561479 | 9/1993 |
| EP | 0576970 | 1/1994 |
| EP | 0632063 | 1/1995 |
| EP | 0659758 | 6/1995 |
| EP | 0661300 | 7/1995 |
| EP | 699213 | 3/1996 |
| EP | 0768319 | 4/1997 |
| EP | 1333044 | 8/2003 |
| EP | 1572755 | 9/2005 |
| EP | 2003166 | 12/2008 |
| GB | 1525978 | 9/1978 |
| JP | H 08-325333 A | 12/1996 |
| JP | 2000-191719 A | 7/2000 |
| WO | WO-9303093 | 2/1993 |
| WO | 9414855 | 7/1994 |
| WO | WO-9600243 | 1/1996 |
| WO | WO-9704015 | 7/1996 |
| WO | 9702294 | 1/1997 |
| WO | WO-9736937 | 10/1997 |
| WO | WO-98/27124 | 6/1998 |
| WO | WO-98/40419 | 9/1998 |
| WO | WO-99/06414 | 2/1999 |
| WO | WO 9950318 A1 | 10/1999 |
| WO | WO-9960036 | 11/1999 |
| WO | WO-0005277 | 2/2000 |
| WO | WO-00/31090 | 6/2000 |
| WO | 0068285 | 11/2000 |
| WO | WO-01/41920 | 6/2001 |
| WO | WO-0198409 | 12/2001 |
| WO | WO-2005006164 | 7/2005 |
| WO | 2005103095 | 11/2005 |
| WO | WO-2005103096 | 11/2005 |
| WO | 2006114209 | 11/2006 |
| WO | 2008077530 | 7/2008 |
| WO | 2008132059 | 11/2008 |
| WO | WO-2010034461 | 4/2010 |
| WO | WO-2010034463 | 4/2010 |
| WO | WO-2010034464 | 4/2010 |
| WO | WO-2010034508 | 4/2010 |
| WO | WO-2010034520 | 4/2010 |

OTHER PUBLICATIONS

Johnson, B et al., "The Influence of Polyolefin Additives on the Performance of Fluorocarbon Elastomer Process Aids", Antec '88 1988, 1425-1429.

Carman, C.J. et al., Macromolecules, 10, 3, 536 1977.

Fieser, Louis et al., "Textbook of Organic Chemistry, Third Revised Edition", Verlag Chemie-GmbH, Weinheim/Bergstr. 1957 1957, 10 pages.

Trinkle, Stefan et al., "Van Gurp-Palmen Plot II—classification of long chain branched polymers by their topology", Rheol Acta 41 (2002), 103-11.

Peacock, Andrew "Handbook of Polyethylene", Exxon Chemical Company, Macel Dekker Inc, pp. 7-10.

Trinkle, Stefan et al. "Van Gurp-Palmen Plot II—classification of long chain branched polymers by their topology", Rheol Acta (2002) 41: 103-11.

Wiesenfeldt, Helga et al. "ansa-Metallocene derivatives"; Journal of Organometallic Chemistry, 369, (1989 ( 359-370); Netherlands.

Wild, Leslie "Temperature Rising Elution Fractionation"; Advances in Polymer Science 98; Springer-Verlag Berlin Heidelberg 1990, pp. 1-47.

Small, Brooke et al. "Highly Active Iron and Cobalt Catalysts for the Polymerization of Ethylene"; 1998 American Chemical Society; Apr. 14, 1998;pp. 4049-4050.

Rudin, Alfred "Fluorocarbon Elastomer Processing Aid in Film Extrusion of Linear Low Density Polyethylenes"; Journal of Plastic Film and Sheeting: vol. 1—Jul. 1985; pp. 189-205.

Kakugo, M et al. "C(13) NMR Determination of Monomer Sequence Distribution in Ethylene-Propyelen Copolymers Prepared with Δ-TiCl3-Al(C2H5)2Cl" Macromolecules 1981;15.; pp. 1150-1152, 1982; American Chemical Society.

Carman, C.J.; "Monomer Sequence Distribution in Ehtylene-Propylene Rubber Measure by 13 C NMR 3. Use of Reaction Probability Model"; Macromolecules; pp. 536-544.

Randall, James :A Review of High Resolution Liquid 13Carbon Nuclear Magnetic Resonance Characterizations of Ethylene-Based Polymers; JMS-Rev. Cromol. Chem. Phys., C29 (2&3), 201-317 (1989).

Wild., L et al. "Determination of Branching Distributions in Polyethylene and Ethylene Copolymers"; Journal of Polymer Science: Polymer Physics Edition, vol. 20, 441-455 (1982).

Pang, Simon et al. "Size-Exclusion Chromotographic Assessment of Long-Chain Branch Frequency in Polyethylenes"; Chapter 17; American Chemical Society, 1993.

Holtrup, Wolfgang "Zur Fraktionierung von Polymeren durch Direktextracktion"; Mackromo. Chem 178, 2335-2349 (1977).

Grubisic, Z., et al.; "A Universal Calibration for Gel Permeation Chromatography"; Polymer Letters, vol. 5, pp. 753-759 (1967); Center for Research of Macromolecules, France.

Britovsek, G. et al. "Novel Olefin Polymerization Catalysts Based on Iron and Cobalt"; Chem. Commun. 1998; 849-850.

Strauss, Steven "The Search for Larger and More Weakly Coordinating Anions"; Chem Rev. 1993. 927-942.

Johnson, B. et al. "The Influence of Polyolefin Additives on the Performance of Fluorocarbon Elastomer Process Aids"; ANTEC '88; pp. 1425-1429.

Pang, S. et al., "Chapter 17—Size-Exclusion Chromatographic Assessment of Long-Chain Branch Frequency in Polyethylenes", American Chemical Society edited by Theodore Provder; ACS Symposium Series 521 (Chromatography of Polymers) 1993, 254-269.

* cited by examiner

Sample 1:
— differential CRYSTAF® distribution dm/dT
—◦— integral CRYSTAF® distrubution ∫ dm

IMPACT RESISTANT LLDPE COMPOSITION AND FILMS MADE THEREOF

This application is the U.S. national phase of International Application PCT/EP2009/006981, filed Sep. 22, 2009, claiming priority to European Application 08016861.0 filed Sep. 25, 2008 and the benefit under 35 U.S.C. 119(e) of U.S. Provisional Application No. 61/195,128, filed Oct. 3, 2008; the disclosures of International Application PCT/EP2009/006981, European Application 08016861.0 and U.S. Provisional Application No. 61/195,128, each as filed, are incorporated herein by reference.

BACKGROUND

The present invention relates to a novel lower density polyethylene, having a multimodal comonomer distribution, and products obtained from use of such polyethylene inter alia for manufacturing extrudated or blown films. Surprisingly, the LLDPE composition of the present invention displays drastically enhanced mechanical impact resistance as well as excellent processing properties, allowing of obviating the addition of processing aids, notably of fluoroelastomers, in film processing.

Polyolefine films made from metallocene-derived LLDPE have become state-of-the-art for foils or films used for packaging goods, due to their good optical properties and sealing strength. However, good processability is not a stronghold of LLDPE films in contrast.

U.S. Pat. No. 5,420,220/Mobil Oil describes a monomodal LLDPE polymer of 0.918 g/cm3 having good dart drop impact strength of about 800 g and good optical properties with a haze value of 5-7, but has very low melt flow index (@2.16 kg) of only 1 g/10 min (and a melt flow ratio MFR21/2=17, MWD=2.6). The monomodal product is polymerized by catalysis with bis(n-butylcyclopentadienyl) zirconium dichloride in a fluidized bed reactor. Whilst films may be manufactured from such product, given the low melt flow rates, film extrusion of such LLDPE requires elevated working pressure and suffers from risk of melt fracture, necessitating to add film processing auxiliaries which is technically undesirable and defies certain production needs, e.g. for food or pharmaceutical packaging products. The processing additives are easily extractable and are deemed hazardous to health and environment.

Often, it is sought to improve the processing properties of such material by adding some amount of more broadly distributed, high density polymer such as classic HDPE grades obtained with Ziegler catalysts.

WO 2001/098409/Univation describes bilayered films made from a blend of homopolymeric HDPE and of metallocene-derived, narrowly distributed VLDPE having a density of from 0.89 to 0.915 g/cm3 in a mixing ration of 20:80, a MWD=Mw/Mn of from 2.0 to 3.0, a CDBI of 50 to 85% the VLDPE being TREF-biomodal, and comparing them to similar, non-blended films made from either one of said components. Despite being bilayered, the dart drop impact strength obtained was only 634 g/mil concomitant with acceptable, but not superior haze values of about 10 and a somewhat inferior gloss.

WO2005/061614/Univation again describes blends of metallocene-produced LLDPE with 2 to 10% (w/w) of different HDPE grades, yielding polymer compositions of a density of from 0.921-0.924 g/cm³ having a melt flow index (@2.16 kg) of about 1.1 g/10 min and a very low dart drop impact of 166 to 318 g only; in fact, even for blends made with HD-LDPE instead of HDPE, the loss of dart drop as compared to the isolated metallocene product usually amounted to 50% or more. At least for some isolated HDPE grades, a good haze of below 10% was reported, however, not balanced by a good dart drop. In summary, it was not achieved to preserve the superior dart drop properties of the metallocene product in the blended composition.

EP-1333 044 B1/Borealis describes a cascaded reactor process firstly synthesizing a high density, low molecular weight ethylene-1-hexene copolymer in a first and second reactor, and finally blending such second product having a density of 0.949 g/cm3 and a melt flow index (@2.16 kg) of 310 g/10 min. being indicative of a comparatively low weight and low viscosity at shear, with a high-molecular weight ethylene-1-buten-copolymer synthesized in a third reactor. A Ziegler-Natta-catalyst was used throughout the reactor cascade. The ensuing VLDPE/HDPE blend had a high load melt flow index (@21.6 kg) of 27 g/10 min. and a melt flow rate MFR of 27, indicative of a strongly increased viscosity at a total density of 0.923 g/cm3. The optical properties of such product were extremely poor, dart drop however amounted to >1700 g. The high viscosity and inferior optical properties however, do not compensate for the superior dart drop impact resistance displayed by the film prepared from such blend.

SUMMARY OF THE INVENTION

It is an object of the present invention to avoid the disadvantages of the prior art and to devise a low density ethylene polymer which has good mechanical impact resistance properties whilst preserving its optical qualities. This object is surprisingly achieved by the polymer composition according to the independent claims and the corresponding products, notably blown or extrudated films, obtained therefrom.

DETAILED DESCRIPTION

Figure 1:
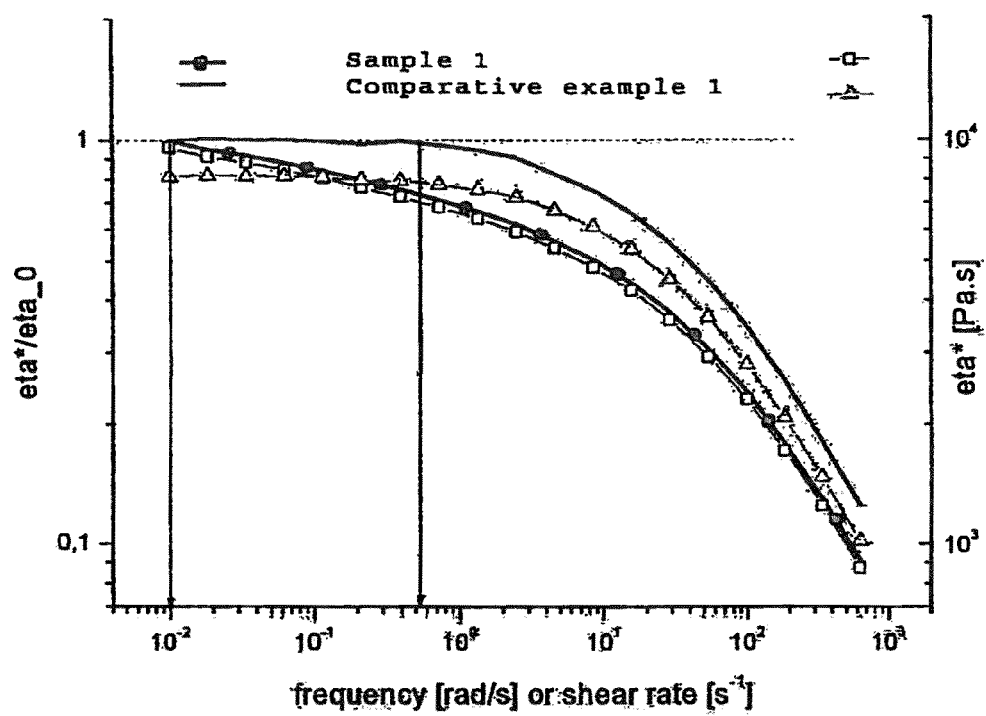
FIG. 1 plots the SHI* value for a batch of the material of the present invention.

According to the present invention, a polyethylene or polyethylene composition is devised that is comprising at least one C3-C20-olefine-comonomer polymerized to ethylene and has a density up to or less than (<=) 0.960 g/cm³, preferably of <0.935 g/cm³ and most preferably of <0.922 g/cm³. Said olefine may be an alkene, alkadiene, alkatriene or other polyene having conjugated or non-conjugated double bonds. More preferably, it is an α-olefine having no conjugated double bonds, most preferably it is an α-alkene.

Preferably, the polyethylene or PE composition of the present invention has a density of from 0.85 to 0.96 g/cm³, more preferably of from 0.90 to 0.935 g/cm³, most preferably of from 0.91 to 0.925 g/cm³ and alone or in combination therewith, preferably it has a melt index (@2.16 kg, 190° C.) measured according to ISO1133:2005 of from 0.1 to 10 g/10 min, preferably of from 0.8 to 5 g/10 min.

Preferably it has a high load melt index (@21.6 kg, 190° C.) measured according to ISO1133:2005 of from 10 to 100 g/10 min, preferably of from 20 to 50 g/10 min.

Further preferred, it has a polydispersity or molecular mass distribution width, MWD with MWD=Mw/Mn, of 3<MWD<8, preferably has a MWD of from 3.6<MWD<5. Further preferred, the melt flow rate MFR, sometimes abbreviated FRR: flow rate ratio, and which is defined as MFR (21.6/2.16)=HLMI/MI, is >18 and preferably is 18<MFR<30.

Further preferred, the polyethylene has a weight average molecular weight Mw of from 50.000 up to 500.000 g/mol, preferably of from 100.000 up to 150.000 g/mol, and preferably has a z-average molecular weight Mz of from 200.000 up to 800.000 g/mol. The z-average molecular weight is more sensitive to the very high-molecular weight fractions which are predominantly determining the viscosity and hence melt flow behaviour. Accordingly, as a further dispersity indexer, the Mz/Mw coefficient may be calculated. Preferably, the polyethylene of the present invention has a Mz/Mw>1.5, preferably >2.

More preferably, said polyethylene is at least bimodal in comonomer distribution, as analyzed by at least one comonomer distribution method of analysis selected from the group consisting of TREF, CRYSTAF® and DSC, preferably it is determined by DSC. Modality, and multimodality respectively, is to be construed in terms of distinct maxima discernible in the distribution curve obtainable e.g. from DSC. Preferably, the polyethylene has a high temperature peak weight fraction (% HT), of from 1 up to 40% of the total weight of the polyethylene composition as determined from CRYSTAF® analysis, that is by the integral of the CRYSTAF® distribution curve in terms of said % HT being the share of polymer above a temperature threshold of 80° C. (for T>80° C. for short), more preferably the polyethylene has a % HT of from 5 up to 30% of total weight, again more preferably of from 10% to 28% and most preferably of from 15% to 25% of total weight of the composition, and further the polyethylene has a low temperature peak weight fraction (% LT) as likewise determined by CRYSTAF® analysis for the share of polymer below a temperature threshold of 80° C. (for T<80° C. for short), of from 95% up to 70% of the total weight of the composition.

Blends made from the polyethylene of the present invention are a further object of the present invention. Hence in any blend made from the Polyethylene composition of the present invention, the relative proportion of the % LT and % HT mass fractions of polyethylene of the present invention used as a component for blending, and as preferably obtained as a reactor blend product itself, is 95-70:5-30.

Further preferred, said % LT fraction has a CDBI value of >60%, preferably of >70%, more preferably of >80%, preferably has a MWD of from 1 to 3.5 and preferably is an ethylene-C3-C20-1-olefine-copolymer as defined for the present invention, more preferably such copolymer is comprising one or two different comonomers.

Again further preferred, the % LT fraction is a LLDPE preferably having a density of from 0.91 to 0.93 g/cm3 or is a VLDPE fraction preferably having a density of from 0.88 to 0.91 g/cm3, and/or is a VLDPE or LLDPE produced by a metallocene catalyst and having a narrow MWD of less than 3.5, preferably having a MWD in the range of from 1 to 3.

Preferably, the % HT fraction of the polyethylene has a density of 0.94 g/cm$^3$ or above, preferably of from 0.94 to 0.98 g/cm$^3$, more preferably of from 0.95 to 0.97 g/cm$^3$, and preferably comprises no or less than 5%, more preferably less than 1%, more preferably less than 0.5% by weight of the HT fraction itself, of comonomer. Further preferred, alone or in combination with the afore said, said % HT fraction has an MWD of >4, preferably of >6, more preferably of >8, most preferably of >10, and preferably up to 20.

Again further preferred, as one outstanding property of the polyethylene or polyethylene composition of the present invention in conjunction to its good processability, the polyethylene has a dart drop impact value, as determined according to ASTM D 1709:2005 Method A on blown films having a film thickness of 25 μm, of at least 1200 g, more preferably of at least 1500 g. Such mechanical impact resistance is obtained with films of only 25 μm thickness, which is remarkable. Partly, such is achieved by a unique degree of homogeneity of the polymer, despite the discontinous comonomer distribution and hence the presence of distinct subfractions within the composition. In relation thereto, preferably, the polymerization reaction for the polyethylene or polyethylene composition has been carried out in a one-pot reaction.

According to the present invention, a copolymer is to be understood as a co-polymer of ethylene with at least one comonomer, that is, a 'copolymer' according to the present invention also encompasses terpolymer and higher, multiple comonomer co-polymerizates. In a preferred embodiment though, a 'copolymer' is a truly binary co-polymerizate of ethylene and of substantially one species of comonomer only. 'substantially one species' preferably means that >97% (w/w) of comonomer contents amounts to one comonomer molecule or species only, other said that the comonomer is at least 97% pure.

CDBI (composition distribution breadth index) is a measure of the breadth of the distribution of the composition. This is described, for example, in WO 93/03093. The CDBI is defined as the percent by weight or mass fraction of the copolymer molecules having a comonomer contents of ±25% of the mean molar total comonomer content, i.e. the share of comonomer molecules whose comonomer content is within 50% of the average comonomer content. It is determined by TREF (temperature rising elution fraction) analysis (Wild et al. J. Poly. Sci., Poly. Phys. Ed. Vol. 20, (1982), 441 or U.S. Pat. No. 5,008,204).

The molar mass distribution width (MWD) or polydispersity is defined as Mw/Mn. Definition of Mw, Mn, Mz, MWD can be found in the 'Handbook of PE', ed. A. Peacock, p. 7-10, Marcel Dekker Inc., New York/Basel 2000. The determination of the molar mass distributions and the means Mn, Mw and Mw/Mn derived therefrom was carried out by high-temperature gel permeation chromatography using a method described in DIN 55672-1:1995-02 issue February 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB. A WATERS Alliance 2000 equipped with the following precolumn SHODEX UT-G and separation columns SHODEX UT 806 M (3×) and SHODEX UT 807 connected in series was used. The solvent was vacuum distilled under Nitrogen and was stabilized with 0.025% by weight of 2,6-di-tert-butyl-4-methylphenol. The flowrate used was 1 ml/min, the injection was 500 μl and polymer concentration was in the range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX, UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., in J. Polymer Sci., Phys. Ed., 5, 753 (1967)). The Mark-Houwing parameters used herefore were for PS: kPS=0.000121 dl/g, αPS=0.706 and for PE kPE=0.000406 dl/g, αPE=0.725, valid in TCB at 135° C. Data recording, calibration and calculation was carried out using NTGPC_Control_V6.02.03 and NTGPC_V6.4.24 (HS-Entwicklungsgesellschaft für wissenschaftliche Hard-und Software mbH, Hauptstraβe 36, D-55437 Ober-Hilbersheim) respectively. Further with relevance to smooth, convenient extrusion processing at low pressure, preferably the amount of the polyethylene of the invention with a molar mass of <1 million g/mol, as determined by GPC for standard determination of the molecular weight distribution, is preferably above 95.5% by weight. This is determined in the usual course of the molar mass distribution measurement by applying the WIN-GPC' software of the company 'HS-Entwicklungsgesellschaft für wissenschaftliche Hard-und Software mbH', Ober-Hilbersheim/Germany, see supra.

Preferably, the blend of the present invention has a storage modulus G' (measured at 0.02 rad/s) of >5 Pa, preferably of >10 Pa and most preferably of >15 Pa. More preferably, alone or in conjunction thereto, the tan δ=G"/G' measure at 0.02 rad is <100, preferably is <50 and most preferably is <20. As is commonly known to the skilled person, G' is determined as the ratio of shear to strain upon dynamic (sinusoidal) deformation of the polymer blend in a dynamic rheometer and is indicative of the elastic properties of a given polymer sample upon shear. Dynamic plate-and-cone or double-plate rheometers are readily commercially available and allow of automated data sampling and direct comparison of data. A detailed description of the experimental approach is given in experimental section.

Preferably, the intrinsic viscosity η(vis) value of the component a) is 0.3 to 7 Pas, more preferably of from 1 to 1.5 Pas or optionally more preferably of from 1.3 to 2.5 Pas. η(vis) is the intrinsic viscosity as determined according to ISO 1628-1 and -3 in Decalin at 135° C. by capillary viscosity measurement.

The polyethylene a) of the invention has preferably at least 0.1 vinyl groups/1000 carbon atoms, e.g. of from 0.6 up to 2 vinyl groups/1000 carbon atoms. The content of vinyl groups/1000 carbon atoms is determined by means of IR, according to ASTM D 6248-98.

The polyethylene of the invention has from 0.01 to 20 branches/1000 carbon atoms, preferably from 0.5 to 10 branches/1000 carbon atoms and particularly preferably from 1.5 to 8 branches/1000 carbon atoms. The branches/1000 carbon atoms are determined by means of 13C-NMR, as described by James. C. Randall, JMS-REV. Macromol. Chem. Phys., C29 (2&3), 201-317 (1989), and refer to the total content of CH3 groups/1000 carbon atoms including end groups. The expressions CH3/1000 carbon atoms and branches/1000 carbon atoms are therefore synonymous, even though typically the dominant share of branching will simply be due to single comonomer insertion into the polymer chain, e.g. a 1-hexene comonomer giving rise to C4 or butyl side chains or short chain branches. The degree of branching plainly is the total CH3 group content/1000 carbon atoms and reflects the comonomer incorporation rate. The degree of branching in the individual polymer mass fractions is determined by the solvent-non-solvent extraction method of Holtrup (W. Holtrup, Makromol. Chem. 178, 2335 (1977)) coupled with 13C-NMR. Xylene and ethylene glycol diethyl ether at 130° C. were used as solvents for such fractionation and 5 g of polyethylene to be split up into 8 fractions by Holtrup fractionation. 13C-NMR high temperature spectra of polymer were acquired on a Bruker DPX-400 spectrometer operating at 100.61 MHz in the Fourier transform mode at 120° C. The peak Sδδ [C. J. Carman, R. A. Harrington and C. E. Wilkes, Macromolecules, 10, 3, 536 (1977)]carbon was used as internal reference at 29.9 ppm. The samples were dissolved in 1,1,2,2-tetrachloroethane-d2 at 120° C. with a 8% wt/v concentration. Each spectrum was acquired with a 90° pulse, 15 seconds of delay between pulses and CPD (WALTZ 16) to remove 1H-13C coupling. About 1500-2000 transients were stored in 32K data points using a spectral window of 6000 or 9000 Hz. The assignments of the spectra, were made referring to Kakugo [M. Kakugo, Y. Naito, K. Mizunuma and T. Miyatake, Macromolecules, 15, 4, 1150, (1982)] and J. C. Randal, Macromol. Chem. Phys., C29, 201 (1989). It is particularly preferred in polyethylene copolymerized with 1-butene, 1-hexene or 1-octene as the 1-alkene to have of from 0.01 to 20 ethyl, butyl or hexyl short chain branches/1000 carbon atoms, more preferably from 1 to 10 ethyl, butyl or hexyl branches/1000 carbon atoms and particularly preferably of from 2 to 6 ethyl, butyl or hexyl branches/1000 carbon atoms. It may otherwise be coined 'short chain branching' (SCB) with such side branches being C2-C6 side chains.

The polyethylene of the invention preferably has a degree of long chain branching λ (lambda) of from 0 to 2 long chain branches/10 000 carbon atoms and particularly preferably from 0.1 to 1.5 long chain branches/10 000 carbon atoms. The degree of long chain branching λ (lambda) was measured by light scattering as described, for example, in ACS Series 521, 1993, Chromatography of Polymers, Ed. Theodore Provder; Simon Pang and Alfred Rudin: Size-Exclusion Chromatographic Assessment of Long-Chain Branch (LCB) Frequency in Polyethylenes, page 254-269. The presence of LCB can further be inferred from rheological data, see Trinkle et al. (Rheol. Acta 2002, 41:103-113; van Gurp-Palmen Plot—classification of long chain branched polymers by their topology).

Strongly preferred, according to the present invention, is that the polyethylene has a substantially multimodal, preferably bimodal, distribution in TREF analysis or DSC analysis, preferably DSC analysis, determining the comonomer content based on crystallinity behaviour/melting temperature essentially independent of molecular weight of a given polymer chain. A TREF- or DSC-multimodal distribution means that TREF/DSC analysis resolves at least two or more distinct maxima indicative of at least two differing branching and hence conomonomer insertion rates during polymerization. TREF analyzes comonomer distribution based on short side chain branching frequency essentially independent of molecular weight, based on the crystallization behaviour (Wild, L., Temperature rising elution fractionation, Adv. Polymer Sci. 98: 1-47, (1990), also see description in U.S. Pat. No. 5,008,204 incorporated herewith by reference).

Typically, in a preferred embodiment of the present invention, the polyethylene comprises at least two, preferably substantially just two, different polymeric subfractions preferably synthesized by different catalysts, namely a first preferably non-metallocene one having a lower and/or no comonomer contents, a high elution temperature (% HT mass fraction) and having preferably a broader molecular weight distribution, and a second, preferably metallocene one, having a higher comonomer contents, a more narrow molecular weight distribution, a lower elution temperature (% LT mass fraction) and, optionally, a lower vinyl group contents. Preferably the 40% by weight or mass fraction, more preferably 20% by weight, of the polyethylene having the highest comonomer content (and lower level of crystallinity) have a degree of branching of from 2 to 40 branches/1000 carbon atoms and/or the 40% by weight or mass fraction, more preferably 20% by weight of the polyethylene having the lowest comonomer content (and higher level of crystallinity)

have a degree of branching of less than 3, more preferably of from 0.01 to 2 branches/1000 carbon atoms. Furthermore, it is preferred that at least 70% of the branches of side chains larger than CH3 in the polyethylene of the invention are present in the 50% by weight of the polyethylene having the highest molar masses. The part of the polyethylene having the lowest or highest molar mass is determined by the method of solvent-nonsolvent fractionation, later called Holtrup fractionation as described already in the foregoing. The degree of branching in the ensuing polymer fractions can be determined by means of 13C-NMR as described by James. C. Randall, JMS-REV. Macromol. Chem. Phys., C29 (2&3), 201-317 (1989).

The polyethylene of the present invention, whilst and despite preferably being bimodal or at least bimodal in comonomer distribution as said above, may be a monomodal or multimodal polyethylene in mass distribution analysis by high temperature gel permeation chromatography analysis (high temperature GPC for polymers according to the method described in DIN 55672-1:1995-02 issue February 1995 with specific deviations made as said above, see section on determining Mw, Mn by means of HT-GPC). The molecular weight distribution curve of a GPC-multimodal polymer can be looked at as the superposition of the molecular weight distribution curves of the polymer subfractions or subtypes which will accordingly show two or more distinct curve maxima instead of the single peaks found in the mass curves for the individual fractions. A polymer showing such a molecular weight distribution curve is called 'bimodal' or 'multimodal' with regard to GPC analysis, respectively.

The polyethylene of the invention may further comprise of from 0 to 6% by weight, preferably 0.1 to 1% by weight of auxiliaries and/or additives known per se, e.g. processing stabilizers, stabilizers against the effects of light and heat an/or oxidants. A person skilled in the art will be familiar with the type and amount of these additives. Notably, as a further advantage of the invention, in a further preferred embodiment the extrusion films made from the adhesive composition of the present invention do not further require the addition of lubricants and/or polymer processing aids (PPA), meaning that the films manufactured from the adhesive polymer composition of the present invention are substantially free from such additives. In particular, said extruded moulded, cast or blown films surprisingly do not require to add fluoroelastomers processing additive for improving processing properties, most preferably blown films made from the polyethylene of the present invention are substantially free, most preferably they are free from fluoroelastomer processing additives or aids. In film blowing, the risk is that superficial melt fracture due to frictional forces, at or shortly after the extrudate leaving the die, embosses the film thus produced with highly unwanted surface roughnesses oftenly called 'shark-skin' appearance. Technically, a product suffering from shark-skin appearance simply is waste; the risk of melt fracture during high-speed processing in modern film blowing machines correlates with the speed of extrusion. That is, the more liable a product is to suffer from melt-fracture phenomena, the lower must be the extrusion speed and pressure of the machine. Said fluoroelastomers function as anti-blocking agent or lubricant. They are conventionally known in the art as processing aids and are commercially available, for example, under the trade names Viton® and Dynamar® (cf. also, for example, U.S. Pat. No. 3,125,547); given the ppm amounts there are added, they also require extensive blending for achieving a uniform distribution before film blowing, such additional blending step being time consuming and a further potential source of failure. Finally, for some appliances such as in the medical or especially in the food industries strongly prefer said additives being absent, since they easily leak onto and adhere to the packaged goods. In particular for food appliances, some first adverse reports on e.g. perfluorinated and potentially hazardous degradation products having been formed upon cooking deep-frozen, film-packaged goods have been published.

A blown film made from a polyethylene of the present invention in the absence of fluoroelastomer auxiliaries allows of a robust process with superior bubble stability, avoiding such lubricating auxiliaries such as, preferably, fluoroelastomers and additional blending step. In comparison to a narrowly distributed, TREF monomodal product manufactured by the same metallocene or first catalyst A) only, the TREF and/or DSC-bi- or multimodal product of the present invention distinguishes by better processability as evidenced by a lower, normalized shear thinning index (SHI*) in comparison to the monomodal comparative product. SHI* is defined as $$SHI^*(\omega)=\eta^*(\omega)/\eta0$$

for any given radiant angle $\omega$ for dynamic viscosity measurement, wherein $\eta 0$ is zero shear viscosity @190° C. determined via the empiric Cox-Merz-rule. $\eta^*$ is the complex viscosity @190° C. determinable upon dynamic (sinusoidal) shearing or deformation of a polymer blend in e.g. a cone-and-plate dynamic rheometer such as a Rheometrics RDA II Dynamic Rheometer as described in the experimental section (s. G' modulus). According to the Cox-Merz-Rule, when the rotational speed $\omega$ is expressed in Radiant units, at low shear rates, the numerical value of $\eta^*$ is equal to that of conventional, intrinsic viscosity based on low shear capillary measurements. The skilled person in the field of rheology is well versed with determining $\eta 0$ in this way.

Preferably, the polyethylene of the present invention has a SHI*(@0.1 rad/s)<0.98, more preferably <0.95, again more preferably <0.9 and most preferably 0.5<SHI*(@0.1 rad/s) <0.95. Alone or in conjunction thereto, preferably, the polyethylene of the present invention has a SHI*(@2 rad/s) of <0.7, preferably the 0.4<SHI*(@2 rad/s)<0.7.

Preferably, the SHI* of the polyethylene of the invention is for any given rotational frequency $\omega$ lowered by at least 10% in comparison to the respective value for the material of the monomodal comparative standard polymerized by the metallocene catalyst alone, that is the pure product of first metallocene catalyst A) under otherwise identical conditions of synthesis and processing.

The surprising element of the present invention is that by rendering the polyethylene of the present invention, which essentially is a metallocene-derived VLDPE or LLDPE, biomodal in comonomer distribution, both the excellent dart drop properties of the metallocene product are literally preserved whilst strongly enhancing processability. From the prior art, the skilled person would have expected that the latter may only be achieved at the expense of the former, obliging to compromise; surprisingly, with the present invention a polyethylene material has been defined without compromising the mechanical impact properties, that is dart drop resistance properties by enhanced processability.

In general, mixing of the additives and the polyethylene of the invention can be carried out by all known methods, though preferably directly by means of an extruder such as a twin-screw extruder. Films produced by film extrusion from the adhesive composition of the present invention are a further object of the present invention. The extruder technique is described e.g. in U.S. Pat. No. 3,862,265, U.S. Pat. No. 3,953, 655 and U.S. Pat. No. 4,001,172, incorporated herewith by reference. The film extrusion process is preferably operated, according to the present invention, at a pressure of 100 to 500 bar and preferably a temperature of from 200 to 300° C.

The polyethylenes of the invention can be used to prepare films with a thickness of from 5 μm to 2.5 mm. The films can e.g. be prepared via blown film extrusion with a thickness of from 5 μm to 250 μm or via cast film extrusion with a thickness of from 10 μm to 2.5 mm. Blown films are a particularly preferred embodiment. During blown film extrusion the polyethylene melt is forced through an annular die. The bubble that is formed is inflated with air and hauled off at a higher speed than the die outlet speed. The bubble is intensively cooled by a current of air so that the temperature at the frost line is lower than the crystallite melting point. The bubble dimensions are fixed here. The bubble is then collapsed, trimmed if necessary and rolled up using a suitable winding instrument. The polyethylenes of the invention can be extruded by either the "conventional" or the "long stalk" method. The flat films can be obtained e.g. in chill roll lines or thermoforming film lines. Furthermore composite films from the inventive polyethylene can be produced on coating and laminating lines. Especially preferred are composite films wherein paper, aluminium or fabric substrates are incorporated into the composite structure. The films can be monolayered or multilayered, obtained by coextrusion and are preferably monolayered. Films in which the polyethylene of the invention is present as a significant component are ones which, apart from non-polymeric additives, comprise from 50 to 100% by weight, preferably from 70 to 90% by weight, of the polyethylene of the present invention and preferably are substantially free from fluoroelastomers. In particular, films in which one of the layers contains from 50 to 100% by weight of the polyethylene of the invention are also included.

The polyethylene or PE composition of the present invention is obtainable using the catalyst system described below and in particular its preferred embodiments. Preferably, the polymerization reaction is carried out with a catalyst composition comprising two catalysts, preferably comprising at least two transition metal complex catalysts, more preferably comprising just two transition metal complex catalysts, and preferably in substantially a single reactor system. This one-pot reaction approach provides for an unmatched homogeneity of the product thus obtained from the catalyst systems employed. In the present context, a bi- or multizonal reactor providing for circulation or substantially free flow of product in between the zones, at least from time to time and into both directions, is considered a single reactor or single reactor system according to the present invention.

For the polymerization method for devising the polyethylene, further it is preferred that a first catalyst is a single site catalyst or catalyst system, preferably is a metallocene catalyst A) including half-sandwich or mono-sandwich metallocene catalysts having single-site characteristic, and which first catalyst is providing for a first product fraction which makes up for the % LT peak weight fraction, and further preferably wherein a second catalyst B) is a non-metallocene catalyst or catalyst system, more preferably said second catalyst being a non-single site metal complex catalyst which preferably is providing for a second product fraction which makes up for the % HT peak weight fraction. More preferably, in one embodiment of the present invention, B) preferably is at least one iron complex component B1) which iron complex preferably has a tridentate ligand.

In another preferred embodiment, the non-metallocene polymerization catalyst B) is a monocyclopentadienyl complex catalyst of a metal of groups 4 to 6 of the Periodic Table of the Elements B2), preferably a metal selected from the group consisting of Ti, V, Cr, Mo and W, whose cyclopentadienyl system is substituted by an uncharged donor and has the general formula Cp-Zk-A-MA with the Cp-Zk-A moiety being of formula:

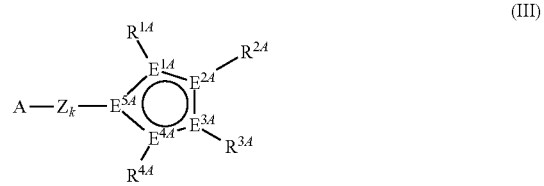

wherein the variables have the following meanings:
E1A-E5A are each carbon or not more than one E1A to E5A phosphorus, preferably E1A to E5A are carbon.
R1A-R4A are each, independently of one another, hydrogen, C1-C22-alkyl, C2-C22-alkenyl, C6-C22-aryl, alkylaryl having from 1 to 10 carbon atoms in the alkyl radical and 6-20 carbon atoms in the aryl radical, NR5A2, N(SiR5A3)2, OR5A, OSiR5A3, SiR5A3, BR5A2, where the organic radicals R1A-R4A may also be substituted by halogens and two vicinal radicals R1A-R4A may also be joined to form at least one five-, six- or seven-membered carbocyclic ring, and/or two vicinal radicals R1A-R4A may be joined to form at least one five-, six- or seven-membered heterocycle containing at least one atom from the group consisting of N, P, O and S, with the proviso that if there is more than one ring or heterocycle formed by said joint radicals, said rings or heterocycles form a condensed polycyclic ring system, preferably they form an ortho-fused, condensed polycyclic ring system, more preferably the polycyclic ring system formed by the radicals R1A-R4A comprises 1 or up to 2 five-, six- or seven-membered carbocyclic rings or heterocycles which rings or heterocycles may again be further substituted with halogeno, NR5A2, N(SiR5A3)2, OR5A, OSiR5A3, SiR5A3, BR5A2, C1-C22-alkyl or C2-C22-alkenyl,
the radicals R5A are each, independently of one another, hydrogen, C1-C20-alkyl, C2-C20-alkenyl, C6-C20-aryl, alkylaryl having from 1 to 10 carbon atoms in the alkyl part and 6-20 carbon atoms in the aryl part and two geminal radicals R5A may also be joined to form a five- or six-membered ring,
Z is a divalent bridge between A and Cp which is selected from the group consisting of

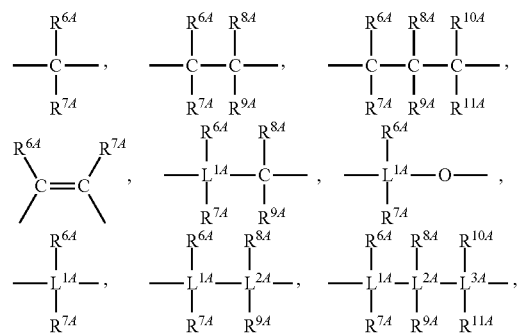

—BR6A-, —BNR6AR7A-, —AlR6A-, —Sn(II)-, —O—, —S—, —SO—, —SO2-, —NR6A-, —CO—, —PR6A- or —P(O)R6A-, wherein
L1A-L3A are each, independently of one another, silicon Si or germanium Ge,
R6A-R11A are each, independently of one another, hydrogen, C1-C20-alkyl, C2-C20-alkenyl, C6-C20-aryl, alkylaryl having from 1 to 10 carbon atoms in the alkyl part and 6-20 carbon atoms in the aryl part or SiR12A3, where the organic radicals R6A-R11A may also be substituted by halogens and two geminal or vicinal radicals R6A-R11A may also be joined to form a five- or six-membered ring and
the radicals R12A are each, independently of one another, hydrogen, C1-C20-alkyl, C2-C20-alkenyl, C6-C20-aryl or alkylaryl having from 1 to 10 carbon atoms in the alkyl part and 6-20 carbon atoms in the aryl part, C1-C10-alkoxy or C6-C10-aryloxy and two radicals R12A may also be joined to form a five- or six-membered ring, and
A is an uncharged donor group containing one or more atoms of group 15 and/or 16 of the Periodic Table of the Elements, preferably A is an unsubstituted, substituted or fused heteroaromatic ring system which contains heteroatoms from the group consisting of oxygen, sulfur, nitrogen and phosphorus in addition to ring carbons.
MA is a metal from Groups IV to VI of the Periodic Table, preferably selected from the group consisting of titanium in the oxidation state 3, vanadium, chromium, molybdenum and tungsten and
k is 0 or 1.

Suitable examples, according to some preferred embodiment of the invention, of the Cp moiety forming carbo- or heterocyclic, polycyclic ring systems jointly with the radicals R1A-R4A, are for instance: 1-indenyl, 9-fluorenyl, 1-s-(monohydro)-indacenyl. 1-indenyl and ortho-fused, tri- or higher carbocyclic ring systems comprising said 1-indenyl-moiety are strongly preferred. 1-indenyl and 1-s-(1H)-indacenyl are especially preferred. Suitable monocyclopentadienyl catalyst having non-single site, polydisperse product characteristics when copolymerizing ethylene with olefine comonomers, especially C3-C20 comonomers, most preferably C3-C10 comonomers, are described in EP-1572755-A. The non-single site characteristic is a functional descriptor for any such complex B2) as described in the foregoing since it is highly dependent on the specific combination and connectivity, of aromatic ligands chosen.

Even more preferably, in combination with a monocyclopentadienly catalyst complex A1) as defined above, A is a group of the formula (IV)

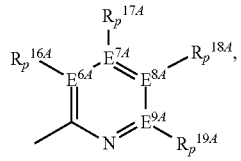

(IV)

wherein
E6A-E9A are each, independently of one another, carbon or nitrogen,
R16A-R19A are each, independently of one another, hydrogen, C1-C20-alkyl, C2-C20-alkenyl, C6-C20-aryl, alkylaryl having from 1 to 10 carbon atoms in the alkyl part and 6-20 carbon atoms in the aryl part or SiR20A3, where the organic radicals R16A-R19A may also be substituted by halogens or nitrogen and further C1-C20-alkyl, C2-C20-alkenyl, C6-C20-aryl, alkylaryl having from 1 to 10 carbon atoms in the alkyl part and 6-20 carbon atoms in the aryl part or SiR20A3 and two vicinal radicals R16A-R19A or R16A and Z may also be joined to form a five- or six-membered ring and
the radicals R20A are each, independently of one another, hydrogen, C1-C20-alkyl, C2-C20-alkenyl, C6-C20-aryl or alkylaryl having from 1 to 10 carbon atoms in the alkyl radical and 6-20 carbon atoms in the aryl radical and two radicals R20A may also be joined to form a five- or six-membered ring and
p is 0 when E6A-E9A is nitrogen and is 1 when E6A-E9A is carbon.

Preferably, A is defined as in formula IV above, wherein 0 or 1 E6A-E9A are nitrogen. In relation to the general composition of the catalyst A1), Cp-Zk-A-MA, and in particular in combination with any preferred embodiment described in the foregoing, it is further strongly preferred that MA is chromium in the oxidation states 2, 3 and 4, more preferably that MA is chromium in the oxidation state 3.

Preferably, the first and/or metallocene catalyst A) is at least one Zirconocene catalyst or catalyst system. Zirconocene catalyst according to the present invention are, for example, cyclopentadienyl complexes. The cyclopentadienyl complexes can be, for example, bridged or unbridged biscyclopentadienyl complexes as described, for example, in EP 129 368, EP 561 479, EP 545 304 and EP 576 970, bridged or unbridged monocyclopentadienyl 'half-sandwich' complexes such as e.g. bridged amidocyclopentadienyl complexes described in EP 416 815 or half-sandwich complexes described in U.S. Pat. No. 6,069,213, U.S. Pat. No. 5,026,798, further can be multinuclear cyclopentadienyl complexes as described in EP 632 063, pi-ligand-substituted tetrahydropentalenes as described in EP 659 758 or pi-ligand-substituted tetrahydroindenes as described in EP 661 300. Non-limiting examples of metallocene catalyst components consistent with the description herein include, for example: cyclopentadienylzirconiumdichloride, indenylzirconiumdichloride, (1-methylindenyl)zirconiumdichloride, (2-methylindenyl)zirconiumdichloride, (1-propylindenyl)zirconiumdichloride, (2-propylindenyl)zirconiumdichloride, (1-butylindenyl)zirconiumdichloride, (2-butylindenyl)zirconiumdichloride, methylcyclopentadienylzirconiumdichloride, tetrahydroindenylzirconiumdichloride, pentamethylcyclopentadienylzirconiumdichloride, cyclopentadienylzirconiumdichloride, pentamethylcyclopentadienyltitaniumdichloride, tetra methylcyclopentyltitaniumdichloride, (1,2,4-trimethylcyclopentadienyl)zirconiumdichloride, dimethylsilyl(1,2,3,4-tetramethylcyclopentadienyl)(cyclopentadienyl) zirconiumdichloride, dimethylsilyl(1,2,3,4-tetramethylcyclopentadienyl)(1,2,3-trimethylcyclopentadienyl)zirconiumdichloride, dimethylsilyl(1,2,3,4-tetramethylcyclopentadienyl)(1,2-dimethylcyclopenta-dienyl)zirconiumdichloride, dimethylsilyl(1,2,3,4-tetramethylcyclopentadienyl)(2-methylcyclopentadienyl)zirconiumdichloride, dimethylsilylcyclopentadienylindenylzirconium dichloride, dimethylsilyl(2-methylindenyl)(fluorenyl)zirconiumdichloride, diphenylsilyl(1,2,3,4-tetramethylcyclopentadienyl)(3-propylcyclopentadienyl)zirconiumdichloride.

Particularly suitable zirconocenes (A) are Zirconium complexes of the general formula

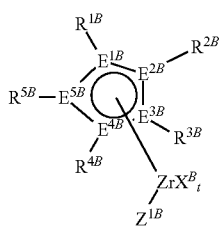

where the substituents and indices have the following meanings:

XB is fluorine, chlorine, bromine, iodine, hydrogen, C1-C10-alkyl, C2-C10-alkenyl, C6-C15-aryl, alkylaryl having from 1 to 10 carbon atoms in the alkyl part and from 6 to 20 carbon atoms in the aryl part, —OR6B or —NR6BR7B, or two radicals XB form a substituted or unsubstituted diene ligand, in particular a 1,3-diene ligand, and the radicals XB are identical or different and may be joined to one another, E1B-E5B are each carbon or not more than one E1B to E5B is phosphorus or nitrogen, preferably carbon, t is 1, 2 or 3 and is, depending on the valence of Hf, such that the metallocene complex of the general formula (VI) is uncharged, where R6B and R7B are each C1-C10-alkyl, C6-C15-aryl, alkylaryl, arylalkyl, fluoroalkyl or fluoroaryl each having from 1 to 10 carbon atoms in the alkyl part and from 6 to 20 carbon atoms in the aryl part and R1B to R5B are each, independently of one another hydrogen, C1-C22-alkyl, 5- to 7-membered cycloalkyl or cycloalkenyl which may in turn bear C1-C10-alkyl groups as substituents, C2-C22-alkenyl, C6-C22-aryl, arylalkyl having from 1 to 16 carbon atoms in the alkyl part and from 6 to 21 carbon atoms in the aryl part, NR8B2, N(SiR8B3)2, OR8B, OSiR8B3, SiR8B3, where the organic radicals R1B-R5B may also be substituted by halogens and/or two radicals R1B-R5B, in particular vicinal radicals, may also be joined to form a five-, six- or seven-membered ring, and/or two vicinal radicals R1D-R5D may be joined to form a five-, six- or seven-membered heterocycle containing at least one atom from the group consisting of N, P, O and S, where the radicals R8B can be identical or different and can each be C1-C10-alkyl, C3-C10-cycloalkyl, C6-C15-aryl, C1-C4-alkoxy or C6-C10-aryloxy and Z1B is XB or

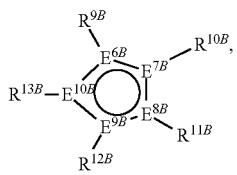

where the radicals

R9B to R13B are each, independently of one another, hydrogen, C1-C22-alkyl, 5- to 7-membered cycloalkyl or cycloalkenyl which may in turn bear C1-C10-alkyl groups as substituents, C2-C22-alkenyl, C6-C22-aryl, arylalkyl having from 1 to 16 carbon atoms in the alkyl part and 6-21 carbon atoms in the aryl part, NR14B2, N(SiR14B3)2, OR14B, OSiR14B3, SiR14B3, where the organic radicals R9B-R13B may also be substituted by halogens and/or two radicals R9B-R13B, in particular vicinal radicals, may also be joined to form a five-, six- or seven-membered ring, and/or two vicinal radicals R9B-R13B may be joined to form a five-, six- or seven-membered heterocycle containing at least one atom from the group consisting of N, P, O and S, where the radicals R14B are identical or different and are each C1-C10-alkyl, C3-C10-cycloalkyl, C6-C15-aryl, C1-C4-alkoxy or C6-C10-aryloxy, E6B-E10B are each carbon or not more than one E6B to E10B is phosphorus or nitrogen, preferably carbon, or where the radicals R4B and Z1B together form an -R15Bv-A1B-group, where R15B is

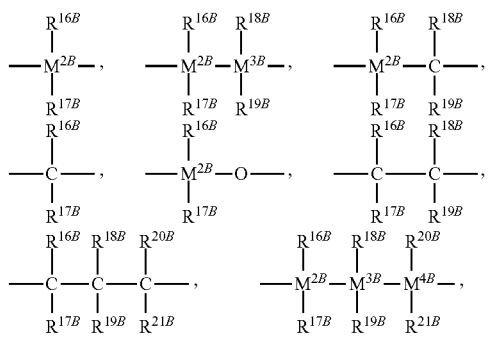

or is =BR16B, =BNR16BR17B, =AlR16B, —Ge(II)-, —Sn(II)-, —O—, —S—, =SO, =SO2, =NR16B, =CO, =PR16B or =P(O)R16B, where R16B-R21B are identical or different and are each a hydrogen atom, a halogen atom, a trimethylsilyl group, a C1-C10-alkyl group, a C1-C10-fluoroalkyl group, a C6-C10-fluoroaryl group, a C6-C10-aryl group, a C1-C10-alkoxy group, a C7-C15-alkylaryloxy group, a C2-C10-alkenyl group, a C7-C40-arylalkyl group, a C8-C40-arylalkenyl group or a C7-C40-alkylaryl group or two adjacent radicals together with the atoms connecting them form a saturated or unsaturated ring having from 4 to 15 carbon atoms, and M2B-M4B are independently each Si, Ge or Sn, preferably are Si, A1B is —O—, —S—,

=O, =S, =NR22B, —O—R22B, —NR22B2, —PR22B2 or an unsubstituted, substituted or fused, heterocyclic ring system, where the radicals R22B are each, independently of one another, C1-C10-alkyl, C6-C15-aryl, C3-C10-cycloalkyl, C7-C18-alkylaryl or Si(R23B)3, R23B is hydrogen, C1-C10-alkyl, C6-C15-aryl which may in turn bear C1-C4-alkyl groups as substituents or C3-C10-cycloalkyl, v is 1 or when A1B is an unsubstituted, substituted or fused, heterocyclic ring system may also be 0 or where the radicals R4B and R12B together form an -R15B-group.

A1B can, for example together with the bridge R15B, form an amine, ether, thioether or phosphine. However, A1B can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups which can contain from one to four nitrogen atoms and/or a sulfur or oxygen atom as ring members in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 2-oxazolyl. Examples of 6-membered heteroaryl groups which may contain from one to four nitrogen atoms and/or a phosphorus atom are 2-pyridinyl, 2-phosphabenzenyl, 3-pyridazinyl, 2-pyrimidinyl, 4-pyrimidinyl, 2-pyrazinyl, 1,3,5-triazin-2-yl. The 5-membered and 6-membered heteroaryl groups may also be substituted by C1-C10-alkyl, C6-C10-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl. Examples of benzo-fused 6-membered heteroaryl groups are 2-quinolyl, 8-quinolyl, 3-cinnolyl, 1-phthalazyl, 2-quinazolyl and 1-phenazyl. Naming and numbering of the heterocycles has been taken from L. Fieser and M. Fieser, Lehrbuch der organischen Chemie, 3rd revised edition, Verlag Chemie, Weinheim 1957.

The radicals XB in the general formula (I) are preferably identical, preferably fluorine, chlorine, bromine, C1-C7-alkyl or aralkyl, in particular chlorine, methyl or benzyl.

Among the zirconocenes of the general formula (I), those of the formula (II)

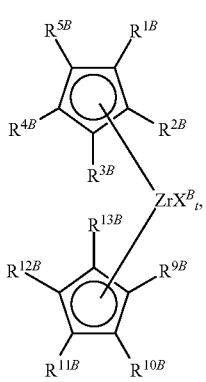

(II)

are preferred.

Among the compounds of the formula (VII), preference is given to those in which
XB is fluorine, chlorine, bromine, C1-C4-alkyl or benzyl, or two radicals XB form a substituted or unsubstituted butadiene ligand,
t is 1 or 2, preferably 2,
R1B to R5B are each hydrogen, C1-C8-alkyl, C6-C8-aryl, NR8B2, OSiR8B3 or Si(R8B)3 and
R9B to R13B are each hydrogen, C1-C8-alkyl or C6-C8-aryl, NR14B2, OSiR14B3 or Si(R14B)3 or in each case two radicals R1B to R5B and/or R9B to R13B together with the C5 ring form an indenyl, fluorenyl or substituted indenyl or fluorenyl system.

The zirconocenes of the formula (II) in which the cyclopentadienyl radicals are identical are particularly useful.

The synthesis of such complexes can be carried out by methods known per se, with the reaction of the appropriately substituted cyclic hydrocarbon anions with halides of Zirconium being preferred. Examples of appropriate preparative methods are described, for example, in Journal of Organometallic Chemistry, 369 (1989), 359-370.

The metallocenes can be used in the Rac or pseudo-Rac form. The term pseudo-Rac refers to complexes in which the two cyclopentadienyl ligands are in the Rac arrangement relative to one another when all other substituents of the complex are disregarded.

Preferably, the second catalyst or catalyst system B) is at least one polymerization catalyst based on an iron component having a tridentate ligand bearing at least two aryl radicals, more preferably wherein each of said two aryl radicals bears a halogen and/or an alkyl substituent in the ortho-position, preferably wherein each aryl radical bears both a halogen and an alkyl substituent in the ortho-positions.

Suitable catalysts B) preferably are iron catalyst complexes of the general formulae (IIIa):

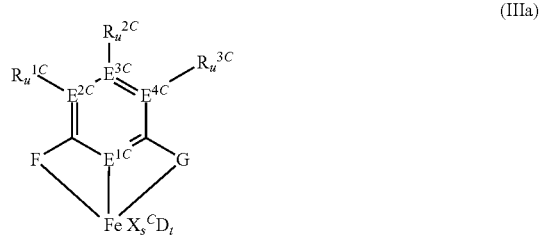

(IIIa)

wherein the variables have the following meaning:
F and G, independently of one another, are selected from the group consisting of:

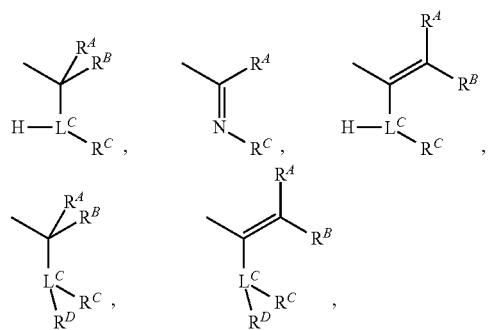

wherein Lc is nitrogen or phosphor, preferably is nitrogen,
And further wherein preferably at least one of F and G is an enamine or imino radical as selectable from above said group, with the proviso that where F is imino, then G is imino with G, F each bearing at least one aryl radical with each bearing a halogen or a tert. alkyl substituent in the ortho-position, together giving rise to the tridentate ligand of formula IIIa, or then G is enamine, more preferably that at least F or G or both are an enamine radical as selectable from above said group or that both F and G are imino, with G, F each bearing at least one, preferably precisely one, aryl radical with each said aryl radical bearing at least one halogen or at least one C1-C22 alkyl substituent, preferably precisely one halogen or one C1-C22 alkyl, in the ortho-position, R1C-R3C are each, independently of one another, hydrogen C1-C22-alkyl, C2-C22-alkenyl, C6-C22-aryl, alkylaryl having from 1 to 10 carbon atoms in the alkyl part and 6-20 carbon atoms in the aryl part, halogen, NR18C2, OR18C, SiR19C3, where the organic radicals R1C-R3C may also be substituted by halogens and/or two vicinal radicals R1C-R3C may also be joined to form a five-, six- or seven-membered ring, and/or two vicinal radicals R1C-R3C are joined to form a five-, six- or seven-membered heterocycle containing at least one atom from the group consisting of N, P, O and S, RA,RB independently of one another denote hydrogen, C1-C20-alkyl, C2-C20-alkenyl, C6-C20-aryl, arylalkyl having 1 to 10 C atoms in the alkyl radical and 6 to 20 C atoms in the aryl radical, or SiR19C3, wherein the organic radicals RA,RB can also be substituted by halogens, and/or in each case two radicals RA,RB can also be bonded with one another to form a five- or six-membered ring, RC,RD independently of one another denote C1-C20-alkyl, C2-C20-alkenyl, C6-C20-aryl, arylalkyl having 1 to 10 C atoms in the alkyl radical and 6 to 20 C atoms in the aryl radical, or SiR19C3, wherein the organic radicals RC,RD can also be substituted by halogens, and/or in each case two radicals RC,RD can also be bonded with one another to form a five- or six-membered ring, E1C is nitrogen or phosphorus, preferably is nitrogen, E2C-E4C are each, independently of one another, carbon, nitrogen or phosphorus and preferably with the proviso that where E1C is phosphorus, then E2C-E4C are carbon each, more preferably they are carbon or nitrogen and preferably with the proviso that 0, 1 or 2 atoms selected from the group E2C-E4C may be nitrogen, most preferably E2C-E4C are carbon each.

u is 0 when the corresponding E2C-E4C is nitrogen or phosphorus and is 1 when E2C-E4C is carbon, and wherein the radicals R18C, R19C, XC are defined in and for formula IIIa above identically as given for formula III below, D is an uncharged donor and s is 1, 2, 3 or 4, t is 0 to 4.

The three atoms E2C to E4C in a molecule can be identical or different. If E1C is phosphorus, then E2C to E4C are preferably carbon each. If E1C is nitrogen, then E2C to E4C are each preferably nitrogen or carbon, in particular carbon.

In a preferred embodiment the complexes (B) are of formula (IV)

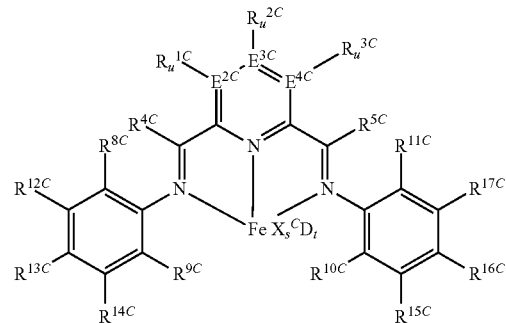

(IV)

where

E2C-E4C are each, independently of one another, carbon, nitrogen or phosphorus, preferably are carbon or nitrogen, more preferably 0, 1 or 2 atoms of E2C-E4C are nitrogen with the proviso that the remaining radicals E2C-E4C≠nitrogen are carbon, most preferably they are carbon each, R1C-R3C are each, independently of one another, hydrogen, C1-C22-alkyl, C2-C22-alkenyl, C6-C22-aryl, alkylaryl having from 1 to 10 carbon atoms in the alkyl part and 6-20 carbon atoms in the aryl part, halogen, NR18C2, OR18C, SiR19C3, where the organic radicals R1C-R3C may also be substituted by halogens and/or two vicinal radicals R1C-R3C may also be joined to form a five-, six- or seven-membered ring, and/or two vicinal radicals R1C-R3C are bound to form a five-, six- or seven-membered heterocycle containing at least one atom from the group consisting of N, P, O and S, R4C-R5C are each, independently of one another, hydrogen, C1-C22-alkyl, C2-C22-alkenyl, C6-C22-aryl, alkylaryl having from 1 to 10 carbon atoms in the alkyl part and 6-20 carbon atoms in the aryl part, NR18C2, SiR19C3, where the organic radicals R4C-R5C may also be substituted by halogens, u is 0 when E2C-E4C is nitrogen or phosphorus and is 1 when E2C-E4C is carbon, R8C-R11C are each, independently of one another, C1-C22-alkyl, C2-C22-alkenyl, C6-C22-aryl, alkylaryl having from 1 to 10 carbon atoms in the alkyl part and 6-20 carbon atoms in the aryl part, halogen, NR18C2, OR18C, SiR19C3, where the organic radicals R8C-R11C may also be substituted by halogens and/or two vicinal radicals R8C-R17C may also be joined to form a five-, six- or seven-membered ring, and/or two vicinal radicals R8C-R17C are joined to form a five-, six- or seven-membered heterocycle containing at least one atom from the group consisting of N, P, O and S, and wherein R8C-R11C may be a halogen selected from the group consisting of chlorine, bromine, fluorine, and preferably with the proviso that at least R8C and R10C are halogen or a C1-C22-alkyl group, R12C-R17C are each, independently of one another, hydrogen, C1-C22-alkyl, C2-C22-alkenyl, C6-C22-aryl, alkylaryl having from 1 to 10 carbon atoms in the alkyl part and 6-20 carbon atoms in the aryl part, halogen, NR18C2, OR18C, SiR19C3, where the organic radicals R12C-R17C may also be substituted by halogens and/or two vicinal radicals R8C-R17C may also be joined to form a five-, six- or seven-membered ring, and/or two vicinal radicals R8C-

R17C are joined to form a five-, six- or seven-membered heterocycle containing at least one atom from the group consisting of N, P, O or S, the indices v are each, independently of one another, 0 or 1, the radicals XC are each, independently of one another, fluorine, chlorine, bromine, iodine, hydrogen, C1-C10-alkyl, C2-C10-alkenyl, C6-C20-aryl, alkylaryl having 1-10 carbon atoms in the alkyl part and 6-20 carbon atoms in the aryl part, NR18C2, OR18C, SR18C, SO3R18C, OC(O)R18C, CN, SCN, β-diketonate, CO, BF4$^-$, PF6$^-$ or a bulky noncoordinating anion and the radicals XC may be joined to one another, the radicals R18C are each, independently of one another, hydrogen, C1-C20-alkyl, C2-C20-alkenyl, C6-C20-aryl, alkylaryl having from 1 to 10 carbon atoms in the alkyl part and 6-20 carbon atoms in the aryl part, SiR19C3, where the organic radicals R18C may also be substituted by halogens and nitrogen- and oxygen-containing groups and two radicals R18C may also be joined to form a five- or six-membered ring, the radicals R19C are each, independently of one another, hydrogen, C1-C20-alkyl, C2-C20-alkenyl, C6-C20-aryl, alkylaryl having from 1 to 10 carbon atoms in the alkyl part and 6-20 carbon atoms in the aryl part, where the organic radicals R19C may also be substituted by halogens or nitrogen- and oxygen-containing groups and two radicals R19C may also be joined to form a five- or six-membered ring, s is 1, 2, 3 or 4, in particular 2 or 3, D is an uncharged donor and t is from 0 to 4, in particular 0, 1 or 2.

The substituents R1C-R3C and R8C-R17C can be varied within a wide range. Possible carboorganic substituents R1C-R3C and R8C-R17C are C1-C22-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a C1-C10-alkyl group and/or C6-C10-aryl group as substituents, e.g. cyclopropyl, cyclobutyl, cyclopentyl, cyclohexyl, cycloheptyl, cyclooctyl, cyclononyl or cyclododecyl, C2-C22-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, C6-C22-aryl which may be substituted with further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals R1C-R3C and/or two vicinal radicals R8C-R17C may also be joined to form a 5-, 6- or 7-membered ring and/or two of the vicinal radicals R1C-R3C and/or two of the vicinal radicals R8C-R17C may be joined to form a five-, six- or seven-membered heterocycle containing at least one atom from the group consisting of N, P, O and S and/or the organic radicals R1C-R3C and/or R8C-R17C may also be substituted by halogens such as fluorine, chlorine or bromine. Furthermore, R1C-R3C and R8C-R17C can also be radicals —NR18C2 or —N(SiR19C3)2, —OR18C or —OSiR19C3. Examples are dimethylamino, N-pyrrolidinyl, picolinyl, methoxy, ethoxy or isopropoxy or halogen such as fluorine, chlorine or bromine.

Suitable radicals R19C in said silyl substituents are likewise compliant with the radical description given above for R1C-R3C. Examples are trimethylsilyl, tri-tert-butylsilyl, triallylsilyl, triphenylsilyl or dimethylphenylsilyl. Particularly preferred silyl substituents are trialkylsilyl groups having from 1 to 10 carbon atoms in the alkyl radical, in particular trimethylsilyl groups.

Possible carboorganic substituents R18C are C1-C20-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a C6-C10-aryl group as substituent, e.g. cyclopropyl, cyclobutyl, cyclopentyl, cyclohexyl, cycloheptyl, cyclooctyl, cyclononyl or cyclododecyl, C2-C20-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, C6-C20-aryl which may be substituted by further alkyl groups and/or N- or O-containing radicals, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-ethylphenyl, where two radicals R18C may also be joined to form a 5- or 6-membered ring and the organic radicals R18C may also be substituted by halogens such as fluorine, chlorine or bromine. Preference is given to using C1-C10-alkyl such as methyl, ethyl, n-propyl, n-butyl, tert-butyl, n-pentyl, n-hexyl, n-heptyl, n-octyl, and also vinyl allyl, benzyl and phenyl as radicals R18C.

Preferred radicals R1C-R3C are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl.

Preferred radicals R12C-R17C are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, R13C and R16C are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and R12C, R14C, R15C and R17C are each hydrogen.

The substituents R4C-R5C can be varied within a wide range. Possible carboorganic substituents R4C-R5C are, for example, the following: hydrogen, C1-C22-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a C1-C10-alkyl group and/or C6-C10-aryl group as substituent, e.g. cyclopropyl, cyclobutyl, cyclopentyl, cyclohexyl, cycloheptyl, cyclooctyl, cyclononyl or cyclododecyl, C2-C22-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, C6-C22-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where the organic radicals R4C-R5C may also be substituted by halogens such as fluorine, chlorine or bromine. Furthermore, R4C-R5C can be substituted amino groups NR18C2 or N(SiR19C3)2, for example dimethylamino, N-pyrrolidinyl or picolinyl. Preferred radicals R4C-

R5C are hydrogen, methyl, ethyl, n-propyl, isopropyl, n-butyl, isobutyl, tert-butyl, n-pentyl, n-hexyl, n-heptyl, n-octyl or benzyl, in particular methyl.

Preferred radicals R9C and R11C are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine.

In particular, R8C and R10C are preferably a halogen such as fluorine, chlorine or bromine, particularly chlorine and R9C and R11C are each a C1-C22-alkyl which may also be substituted by halogens, in particular a C1-C22-n-alkyl which may also be substituted by halogens, e.g. methyl, trifluoromethyl, ethyl, n-propyl, n-butyl, n-pentyl, n-hexyl, n-heptyl, n-octyl, vinyl, or a halogen such as fluorine, chlorine or bromine. In another preferred combination R8C and R10C are a C1-C22-alkyl radical, and R9C and R11C are each hydrogen or a halogen such as fluorine, chlorine or bromine.

In particular, R12C, R14C, R15C and R17C are identical, R13C and R16C are identical, R9C and R11C are identical and R8C and R10C are identical. This is also preferred in the preferred embodiments described above.

The ligands XC result, for example, from the choice of the appropriate starting metal compounds used for the synthesis of the iron complexes, but can also be varied afterward. Possible ligands XC are, in particular, the halogens such as fluorine, chlorine, bromine or iodine, in particular chlorine. Alkyl radicals such as methyl, ethyl, propyl, butyl, vinyl, allyl, phenyl or benzyl are also usable ligands XC. Amides, alkoxides, sulfonates, carboxylates and diketonates are also particularly useful ligands XC. As further ligands XC, mention may be made, purely by way of example and in no way exhaustively, of trifluoroacetate, $BF_4^-$, $PF_6^-$ and weakly coordinating or noncoordinating anions (cf., for example, S. Strauss in Chem. Rev. 1993, 93, 927-942), e.g. $B(C_6F_5)_4^-$. Thus, a particularly preferred embodiment is that in which XC is dimethylamide, methoxide, ethoxide, isopropoxide, phenoxide, naphthoxide, triflate, p-toluenesulfonate, acetate or acetylacetonate.

The number s of the ligands XC depends on the oxidation state of the iron. The number s can thus not be given in general terms. The oxidation state of the iron in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to using iron complexes in the oxidation state +3 or +2.

D is an uncharged donor, in particular an uncharged Lewis base or Lewis acid, for example amines, alcohols, ethers, ketones, aldehydes, esters, sulfides or phosphines which may be bound to the iron center or else still be present as residual solvent from the preparation of the iron complexes. The number t of the ligands D can be from 0 to 4 and is often dependent on the solvent in which the iron complex is prepared and the time for which the resulting complexes are dried and can therefore also be a nonintegral number such as 0.5 or 1.5. In particular, t is 0, 1 to 2.

The preparation of the compounds B) is described, for example, in J. Am. Chem. Soc. 120, p. 4049 ff. (1998), J. Chem. Soc., Chem. Commun. 1998, 849, and WO 98/27124. Preferred complexes B) are 2,6-Bis[1-(2-tert.butylphenylimino)ethyl]pyridine iron(II) dichloride, 2,6-Bis[1-(2-tert.butyl-6-chlorophenylimino)ethyl]pyridine iron(II) dichloride, 2,6-Bis[1-(2-chloro-6-methylphenylimino)ethyl]pyridine iron(II) dichloride, 2,6-Bis[1-(2,4-dichlorophenylimino)ethyl]pyridine iron(II) dichloride, 2,6-Bis[1-(2,6-dichlorophenylimino)ethyl]pyridine iron(II) dichloride, 2,6-Bis[1-(2,4-dichlorophenylimino)methyl]pyridine iron(II) dichloride, 2,6-Bis[1-(2,4-dichloro-6-methylphenylimino)ethyl]pyridine iron(II) dichloride-2,6-Bis[1-(2,4-difluorophenylimino)ethyl]pyridine iron(II) dichloride, 2,6-Bis[1-(2,4-dibromophenylimino)ethyl]pyridine iron(II) dichloride or the respective trichlorides, dibromides or tribromides.

The molar ratio of transition metal complex A), that is the single site catalyst producing a narrow MWD distribution, to polymerization catalyst B) producing a broad MWD distribution, is usually in the range from 100-1:1, preferably from 20-5:1 and particularly preferably from 1:1 to 5:1.

The transition metal complex (A) and/or the iron complex (B) sometimes have only a low polymerization activity and are then brought into contact with one or more activators (C), in order to be able to display a good polymerization activity. The catalyst system therefore optionally further comprises, as component (C) one or more activating compounds, preferably one or two activating compounds (C).

The activator or activators (C) are preferably used in an excess or in stoichiometric amounts, in each case based on the complex (A) or (B) which they activate. The amount of activating compound(s) to be used depends on the type of the activator (C). In general, the molar ratio of transition metal complex (A) or the iron or other complex B) to activating compound (C) can be from 1:0.1 to 1:10000, preferably from 1:1 to 1:2000.

In a preferred embodiment of the invention, the catalyst system comprises at least one activating compound (C). They are preferably used in an excess or in stoichiometric amounts based on the catalysts which they activate. In general, the molar ratio of catalyst to activating compound (C) can be from 1:0.1 to 1:10000. Such activator compounds are uncharged, strong Lewis acids, ionic compounds having a Lewis-acid cation or a ionic compounds containing a Brönsted acid as cation in general. Further details on suitable activators of the polymerization catalysts of the present invention, especially on definition of strong, uncharged Lewis acids and Lewis acid cations, and preferred embodiments of such activators, their mode of preparation as well as particularities and the stoichiometrie of their use have already been set forth in detail in WO05/103096 from the same applicant. Examples are aluminoxanes, hydroxyaluminoxanes, boranes, boroxins, boronic acids and borinic acids. Further examples of strong, uncharged Lewis acids for use as activating compounds are given in WO 03/31090 and WO05/103096 incorporated hereto by reference.

Suitable activating compounds (C) are both as an example and as a strongly preferred embodiment, compounds such as an aluminoxane, a strong uncharged Lewis acid, an ionic compound having a Lewis-acid cation or an ionic compound containing. As aluminoxanes, it is possible to use, for example, the compounds described in WO 00/31090 incorporated hereto by reference. Particularly useful aluminoxanes are open-chain or cyclic aluminoxane compounds of the general formula (III) or (IV)

(III)

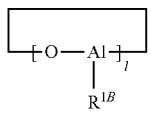

where R1B-R4B are each, independently of one another, a C1-C6-alkyl group, preferably a methyl, ethyl, butyl or isobutyl group and I is an integer from 1 to 40, preferably from 4 to 25.

A particularly useful aluminoxane compound is methyl aluminoxane (MAO).

Furthermore modified aluminoxanes in which some of the hydrocarbon radicals have been replaced by hydrogen atoms or alkoxy, aryloxy, siloxy or amide radicals can also be used in place of the aluminoxane compounds of the formula (III) or (IV) as activating compound (C).

Boranes and boroxines are particularly useful as activating compound (C), such as trialkylborane, triarylborane or trimethylboroxine. Particular preference is given to using boranes which bear at least two perfluorinated aryl radicals. More preferably, a compound selected from the list consisting of triphenylborane, tris(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)borane or tris(3,4,5-trifluorophenyl)borane is used, most preferably the activating compound is tris(penta-fluorophenyl)borane. Particular mention is also made of borinic acids having perfluorinated aryl radicals, for example (C6F5)2BOH. More generic definitions of suitable Bor-based Lewis acids compounds that can be used as activating compounds (C) are given WO05/103096 incorporated hereto by reference, as said above.

Compounds containing anionic boron heterocycles as described in WO 9736937 incorporated hereto by reference, such as for example dimethyl anilino borato benzenes or trityl borato benzenes, can also be used suitably as activating compounds (C). Preferred ionic activating compounds (C) can contain borates bearing at least two perfluorinated aryl radicals. Particular preference is given to N,N-dimethyl anilino tetrakis(pentafluorophenyl)borate and in particular N,N-dimethylcyclohexylammonium tetrakis(pentafluorophenyl)borate, N,N-dimethylbenzylammonium tetrakis(pentafluorophenyl)borate or trityl tetrakispentafluorophenylborate. It is also possible for two or more borate anions to be joined to one another, as in the dianion [(C6F5)2B-C6F4-B(C6F5)2]2-, or the borate anion can be bound via a bridge to a suitable functional group on the support surface. Further suitable activating compounds (C) are listed in WO 00/31090, here incorporated by reference.

Further specially preferred activating compounds (C) preferably include boron-aluminum compounds such as di[bis(pentafluorophenylboroxy)]methylalane. Examples of such boron-aluminum compounds are those disclosed in WO 99/06414 incorporated hereto by reference. It is also possible to use mixtures of all the above-mentioned activating compounds (C). Preferred mixtures comprise aluminoxanes, in particular methylaluminoxane, and an ionic compound, in particular one containing the tetrakis(pentafluorophenyl)borate anion, and/or a strong uncharged Lewis acid, in particular tris(pentafluorophenyl)borane or a boroxin.

The catalyst system may further comprise, as additional component (K), a metal compound as defined both by way of generic formula, its mode and stoichiometrie of use and specific examples in WO 05/103096, incorporated hereto by reference. The metal compound (K) can likewise be reacted in any order with the catalysts (A) and (B) and optionally with the activating compound (C) and the support (D).

A further possibility is to use an activating compound (C) which can simultaneously be employed as support (D). Such systems are obtained, for example, from an inorganic oxide treated with zirconium alkoxide and subsequent chlorination, e.g. by means of carbon tetrachloride. The preparation of such systems is described, for example, in WO 01/41920.

Combinations of the preferred embodiments of (C) with the preferred embodiments of the metallocene (A) and/or the transition metal complex (B) are particularly preferred. As joint activator (C) for the catalyst component (A) and (B), preference is given to using an aluminoxane. Preference is also given to the combination of salt-like compounds of the cation of the general formula (XIII), in particular N,N-dimethylanilinium tetrakis(pentafluorophenyl)borate, N,N-dimethylcyclohexylammonium tetrakis(pentafluorophenyl)borate, N,N-dimethylbenzylammonium tetrakis(pentafluorophenyl)borate or trityl tetrakispentafluorophenylborate, as activator (C) for zirconocenes (A), in particular in combination with an aluminoxane as activator (C) for the iron complex (B).

To enable the metallocene (A) and the iron or other transition metal complex (B) to be used in polymerization processes in the gas phase or in suspension, it is often advantageous to use the complexes in the form of a solid, i.e. for them to be applied to a solid support (D). Furthermore, the supported complexes have a high productivity. The metallocene (A) and/or the iron complex (B) can therefore also optionally be immobilized on an organic or inorganic support (D) and be used in supported form in the polymerization. This enables, for example, deposits in the reactor to be avoided and the polymer morphology to be controlled. As support materials, preference is given to using silica gel, magnesium chloride, aluminum oxide, mesoporous materials, aluminosilicates, hydrotalcites and organic polymers such as polyethylene, polypropylene, polystyrene, polytetrafluoroethylene or polymers bearing polar functional groups, for example copolymers of ethene and acrylic esters, acrolein or vinyl acetate.

Particular preference is given to a catalyst system comprising at least one transition metal complex (A), at least one iron complex (B), at least one activating compound (C) and at least one support component (D), which may an organic or inorganic, preferably porous, solid. (A) and (B) are even more preferably applied to a common or joint support in order to ensure a relatively close spatial proximity of the different catalyst centres and thus to ensure good mixing of the different polymers formed.

Metallocene (A), iron or other transition metal complex (B) and the activating compound (C) can be immobilized independently of one another, e.g. in succession or simultaneously. Thus, the support component (D) can firstly be brought into contact with the activating compound or compounds (C) or the support component (D) can firstly be brought into contact with the transition metal complex (A) and/or the complex (B). Preactivation of the transition metal complex A) by means of one or more activating compounds (C) prior to mixing with the support (D) is also possible. The iron component can, for example, be reacted simultaneously with the transition metal complex with the activating compound (C), or can be preactivated separately by means of the latter. The preactivated complex (B) can be applied to the support before or after the preactivated metallocene complex (A). In one possible embodiment, the complex (A) and/or the complex (B) can also be prepared in the presence of the support material. A further method of immobilization is prepolymerization of the catalyst system with or without prior application to a support.

The immobilization is generally carried out in an inert solvent which can be removed by filtration or evaporation after the immobilization. After the individual process steps, the solid can be washed with suitably inert solvents such as aliphatic or aromatic hydrocarbons and dried. However, the use of the still moist, supported catalyst is also possible.

In a preferred method of preparing the supported catalyst system, at least one complex (B) is brought into contact with an activated compound (C) and subsequently mixed with the dehydrated or passivated support material (D). The metallocene complex (A) is likewise brought into contact with at least one activating compound (C) in a suitable solvent, preferably giving a soluble reaction product, an adduct or a mixture. The preparation obtained in this way is then mixed with the immobilized e.g. iron complex (B), which is used directly or after the solvent has been separated off, and the solvent is completely or partly removed. The resulting supported catalyst system is preferably dried to ensure that all or most of the solvent is removed from the pores of the support material. The supported catalyst is preferably obtained as a free-flowing powder. Examples of the industrial implementation of the above process are described in WO 96/00243, WO 98/40419 or WO 00/05277. A further preferred embodiment comprises firstly producing the activating compound (C) on the support component (D) and subsequently bringing this supported compound into contact with the transition metal complex (A) and the iron or other transition metal complex (B).

The support materials used preferably have a specific surface area in the range from 10 to 1000 m2/g, a pore volume in the range from 0.1 to 5 ml/g and a mean particle size of from 1 to 500 µm. Preference is given to supports having a specific surface area in the range from 50 to 700 m2/g, a pore volume in the range from 0.4 to 3.5 ml/g and a mean particle size in the range from 5 to 350 µm. Particular preference is given to supports having a specific surface area in the range from 200 to 550 m2/g, a pore volume in the range from 0.5 to 3.0 ml/g and a mean particle size of from 10 to 150 µm.

The metallocene complex (A) is preferably applied in such an amount that the concentration of the transition metal from the transition metal complex (A) in the finished catalyst system is from 1 to 200 µmol, preferably from 5 to 100 µmol and particularly preferably from 10 to 70 µmol, per g of support (D). The e.g. iron complex (B) is preferably applied in such an amount that the concentration of iron from the iron complex (B) in the finished catalyst system is from 1 to 200 µmol, preferably from 5 to 100 µmol and particularly preferably from 10 to 70 µmol, per g of support (D).

The inorganic support can be subjected to a thermal treatment, e.g. to remove adsorbed water. Such a drying treatment is generally carried out at temperatures in the range from 50 to 1000° C., preferably from 100 to 600° C., with drying at from 100 to 200° C. preferably being carried out under reduced pressure and/or under a blanket of inert gas (e.g. nitrogen), or the inorganic support can be calcined at temperatures of from 200 to 1000° C. to produce the desired structure of the solid and/or set the desired OH concentration on the surface. The support can also be treated chemically using customary desiccants such as metal alkyls preferably aluminum alkyls, chlorosilanes or SiCl4, or else methylaluminoxane. Appropriate treatment methods are described, for example, in WO 00/31090.

The inorganic support material can also be chemically modified. For example, treatment of silica gel with NH4SiF6 or other fluorinating agents leads to fluorination of the silica gel surface, or treatment of silica gels with silanes containing nitrogen-, fluorine- or sulfur-containing groups leads to correspondingly modified silica gel surfaces.

Organic support materials such as finely divided polyolefin powders (e.g. polyethylene, polypropylene or polystyrene) can also be used and are preferably likewise freed of adhering moisture, solvent residues or other impurities by appropriate purification and drying operations before use. It is also possible to use functionalized polymer supports, e.g. ones based on polystyrene, polyethylene, polypropylene or polybutylene, via whose functional groups, for example ammonium or hydroxy groups, at least one of the catalyst components can be immobilized. It is also possible to use polymer blends.

Inorganic oxides suitable as support component (D) may be found among the oxides of elements of groups 2, 3, 4, 5, 13, 14, 15 and 16 of the Periodic Table of the Elements. Examples of oxides preferred as supports include silicones, dioxide, aluminum oxide and mixed oxides of the elements calcium, aluminum, silicium, magnesium or titanium and also corresponding oxide mixtures. Other inorganic oxides which can be used alone or in combination with the abovementioned preferred oxidic supports are, for example, MgO, CaO, AlPO4, ZrO2, TiO2, B2O3 or mixtures thereof.

Further preferred inorganic support materials are inorganic halides such as MgCl2 or carbonates such as Na2CO3, K2CO3, CaCO3, MgCO3, sulfates such as Na2SO4, Al2 (SO4)3, BaSO4, nitrates such as KNO3, Mg(NO3)2 or Al(NO3)3.

As solid support materials (D) for catalysts for olefin polymerization, preference is given to using silica gels since particles whose size and structure make them suitable as supports for olefin polymerization can be produced from this material. Spray-dried silica gels, which are spherical agglomerates of relatively small granular particles, i.e. primary particles, have been found to be particularly useful. The silica gels can be dried and/or calcinated before use. Further preferred supports (D) are hydrotalcites and calcined hydrotalcites. In mineralogy, hydrotalcite is a natural mineral having the ideal formula

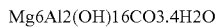
Mg6Al2(OH)16CO3.4H2O whose structure is derived from that of brucite Mg(OH)2. Brucite crystallizes in a sheet structure with the metal ions in octahederal holes between two layers of close-packed hydroxyl ions, with only every second layer of the octahederal holes being occupied. In hydrotalcite, some magnesium ions are replaced by aluminum ions, as a result of which the packet of layers gains a positive charge. This is balanced by the anions which are located together with water of crystallization in the layers in-between.

Such sheet structures are found not only in magnesium-aluminum-hydroxides, but generally in mixed metal hydroxides of the general formula

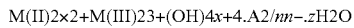
M(II)2x2+M(III)23+(OH)4x+4.A2/nn-.zH2O which have a sheet structure and in which M(II) is a divalent metal such as Mg, Zn, Cu, Ni, Co, Mn, Ca and/or Fe and M(III) is a trivalent metal such as Al, Fe, Co, Mn, La, Ce and/or Cr, x is a number from 0.5 to 10 in steps of 0.5, A is an interstitial anion and n is the charge on the interstitial anion which can be from 1 to 8, usually from 1 to 4, and z is an integer from 1 to 6, in particular from 2 to 4. Possible interstitial anions are organic anions such as alkoxide anions, alkyl ether sulfates, aryl ether sulfates or glycol ether sulfates, inorganic anions such as, in particular, carbonate, hydrogen carbonate, nitrate, chloride, sulfate or B(OH)4- or polyoxometal anions such as Mo7O246- or V10O286-. However, a mixture of a plurality of such anions is also possible.

Accordingly, all such mixed metal hydroxides having a sheet structure should be regarded as hydrotalcites for the purposes of the present invention.

Calcined hydrotalcites are prepared from hydrotalcites by calcination, i.e. heating, by means of which, inter alia, the desired hydroxide group content can be set. In addition, the crystal structure also changes. The preparation of the calcined hydrotalcites used according to the invention is usually carried out at temperatures above 180° C. Preference is given to calcination for a period of from 3 to 24 hours at temperatures of from 250° C. to 1000° C., in particular from 400° C. to 700° C. It is possible for air or inert gas to be passed over the solid or for a vacuum to be applied at the same time. On heating, the natural or synthetic hydrotalcites firstly give off water, i.e. drying occurs. On further heating, the actual calcination, the metal hydroxides are converted into the metal oxides by elimination of hydroxyl groups and interstitial anions; OH groups or interstitial anions such as carbonate can also still be present in the calcined hydrotalcites. A measure of this is the loss on ignition. This is the weight loss experienced by a sample which is heated in two steps firstly for 30 minutes at 200° C. in a drying oven and then for 1 hour at 950° C. in a muffle furnace.

The calcined hydrotalcites used as component (D) are thus mixed oxides of the divalent and trivalent metals M(II) and M(III), with the molar ratio of M(II) to M(III) generally being in the range from 0.5 to 10, preferably from 0.75 to 8 and in particular from 1 to 4. Furthermore, normal amounts of impurities, for example Si, Fe, Na, Ca or Ti and also chlorides and sulfates, can also be present. Preferred calcined hydrotalcites (D) are mixed oxides in which M(II) is magnesium and M(III) is aluminum. Such aluminum-magnesium mixed oxides are obtainable from Condea Chemie GmbH (now Sasol Chemie), Hamburg under the trade name Puralox Mg. Preference is also given to calcined hydrotalcites in which the structural transformation is complete or virtually complete. Calcination, i.e. transformation of the structure, can be confirmed, for example, by means of X-ray diffraction patterns. The hydrotalcites, calcined hydrotalcites or silica gels used are generally used as finely divided powders having a mean particle diameter D50 of from 5 to 200 μm, and usually have pore volumes of from 0.1 to 10 cm3/g and specific surface areas of from 30 to 1000 m2/g. The metallocene complex (A) is preferably applied in such an amount that the concentration of the transition metal from the transition metal complex (A) in the finished catalyst system is from 1 to 100 μmol per g of support (D).

It is also possible for the catalyst system firstly to be prepolymerized with olefin, preferably C2-C10-1-alkenes and in particular ethylene, and the resulting prepolymerized catalyst solid then to be used in the actual polymerization. The mass ratio of catalyst solid used in the prepolymerization to a monomer polymerized onto it is usually in the range from 1:0.1 to 1:1000, preferably from 1:1 to 1:200. Furthermore, a small amount of an olefin, preferably an 1-olefin, for example vinylcyclohexane, styrene or phenyldimethylvinylsilane, as modifying component, an antistatic or a suitable inert compound such as a wax or oil can be added as additive during or after the preparation of the catalyst system. The molar ratio of additives to the sum of transition metal compound (A) and iron complex (B) is usually from 1:1000 to 1000:1, preferably from 1:5 to 20:1.

To prepare the polyethylene of the invention, the ethylene is polymerized as described above with olefines, preferably 1-alkenes or 1-olefines, having from 3 to 20 carbon atoms, preferably having from 3 to 10 carbon atoms. Preferred 1-alkenes are linear or branched C3-C10-1-alkenes, in particular linear 1-alkenes, such as ethene, propene, 1-butene, 1-pentene, 1-hexene, 1-heptene, 1-octene or branched 1-alkenes such as 4-methyl-1-pentene. Particularly preferred are C4-C10-1-alkenes, in particular linear C6-C10-1-alkenes. It is also possible to polymerize mixtures of various 1-alkenes. Preference is given to polymerizing at least one 1-alkene selected from the group consisting of ethene, propene, 1-butene, 1-pentene, 1-hexene, 1-heptene, 1-octene and 1-decene. Where more than one comonomer is employed, preferably one comonomer is 1-butene and a second comonomer is a C5-C10-alkene, preferably is 1-hexene, 1-pentene or 4-methyl-1-pentene; ethylene-1-buten-C5-C10-1-alkene terpolymers are one preferred embodiment. Preferably the weight fraction of such comonomer in the polyethylene is in the range of from 0.1 to 20% by weight, typically about 5-15% at least in the first product fraction synthesized by the transition metal catalyst A) and corresponding to the or one % LT peak fraction.

The process of the invention for polymerizing ethylene with 1-alkenes can be carried out using industrial, commonly known polymerization methods at temperatures in the range from −60 to 350° C., preferably from 0 to 200° C. and particularly preferably from 25 to 150° C., and under pressures of from 0.5 to 4000 bar, preferably from 1 to 100 bar and particularly preferably of from 3 to 40 bar. The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes and gas-phase fluidized-bed processes are all possible.

The polymerization can be carried out either batchwise, e.g. in stirring autoclaves, or continuously, e.g. in tube reactors, preferably in loop reactors.

Among the abovementioned polymerization processes, particular preference is given to gas-phase polymerization, in particular in gas-phase fluidized-bed reactors, solution polymerization and suspension polymerization, in particular in loop reactors and stirred tank reactors. The gas-phase polymerization is generally carried out in the range from 30 to 125° C. at pressures of from 1 to 50 bar.

The gas-phase polymerization can also be carried out in the condensed or supercondensed mode, in which part of the circulating gas is cooled to below the dew point and is recirculated as a two-phase mixture to the reactor. Furthermore, it is possible to use a multizone reactor in which the two polymerization zones are linked to one another and the polymer is passed alternately through these two zones a number of times. The two zones can also have different polymerization conditions. Such a reactor is described, for example, in WO 97/04015. Furthermore, molar mass regulators, for example hydrogen, or customary additives such as antistatics can also be used in the polymerizations. The hydrogen and increased temperature usually lead to lower z-average molar mass, whereby according to the present invention, it is preferably only the single site transition metal complex catalyst A) that is responsive to hydrogen and whose activity is modulated and modulatable by hydrogen.

The preparation of the polyethylene of the invention in preferably a single reactor reduces the energy consumption, requires no subsequent blending processes and makes simple control of the molecular weight distributions and the molecular weight fractions of the various polymers possible. In addition, good mixing of the polyethylene is achieved. Preferably, according to the present invention, the polyethylene of the invention is optimally achieved after a further tempering step of the powdered reaction product, e.g. by gradual, slow heating from 60-70° C. to 200-250° C. in a twin screw extruder (for example, an extruder ZSK 240, Werner & Pfleiderer; max 227 revolutions/min., at 8-12 t/h, for keeping shear low—the actual pumping through a sieve plate into a water bath is achieved by a gear type pump connected to the extruder), this way melting the powder over 5 zones by gradual heating; subsequent zones 6-14 are heated by water steam at 47 bar). Gilles fecit. More preferably, the tempering treatment is carried out in a temperature or peak temperature range of from 60-150° C. and preferably until the peak temperatures in the DSC profile are steady and do not shift anymore.

The following examples illustrate the invention without restricting the scope of the invention.

EXAMPLES

Most specific methods have been described or referenced in the foregoing already.

NMR samples were placed in tubes under inert gas and, if appropriate, melted. The solvent signals served as internal standard in the 1H- and 13C-NMR spectra and their chemical shift was converted into the values relative to TMS.

The branches/1000 carbon atoms are determined by means of 13C-NMR, as described by James. C. Randall, JMS-REV. Macromol. Chem. Phys., C29 (2&3), 201-317 (1989), and are based on the total content of CH3 groups/1000 carbon atoms. The side chains larger than CH3 and especially ethyl, butyl and hexyl side chain branches/1000 carbon atoms are likewise determined in this way. The degree of branching in the individual polymer mass fractions is determined by the method of Holtrup (W. Holtrup, Makromol. Chem. 178, 2335 (1977)) coupled with 13C-NMR. 13C-NMR high temperature spectra of polymer were acquired on a Bruker DPX-400 spectrometer operating at 100.61 MHz in the Fourier transform mode at 120° C. The peak $S\delta\delta$ [C. J. Carman, R. A. Harrington and C. E. Wilkes, Macromolecules, 10, 3, 536 (1977)]carbon was used as internal reference at 29.9 ppm. The samples were dissolved in 1,1,2,2-tetrachloroethane-d2 at 120° C. with a 8% wt/v concentration. Each spectrum was acquired with a 90° pulse, 15 seconds of delay between pulses and CPD (WALTZ 16) to remove 1H-13C coupling. About 1500-2000 transients were stored in 32K data points using a spectral window of 6000 or 9000 Hz. The assignments of the spectra, were made referring to Kakugo [M. Kakugo, Y. Naito, K. Mizunuma and T. Miyatake, Macromolecules, 15, 4, 1150, (1982)] and J. C. Randal, Macromol. Chem. Phys., C29, 201 (1989).

The melting enthalpies of the polymers ($\Delta Hf$) were measured by Differential Scanning calorimetry (DSC) on a heat flow DSC (TA-Instruments Q2000), according to the standard method (ISO 11357-3 (1999)). The sample holder, an aluminum pan, is loaded with 5 to 6 mg of the specimen and sealed. The sample is then heated from ambient temperature to 200° C. with a heating rate of 20 K/min (first heating). After a holding time of 5 minutes at 200° C., which allows complete melting of the crystallites, the sample is cooled to −10° C. with a cooling rate of 20 K/min and held there for 2 minutes. Finally the sample is heated from −10° C. to 200° C. with a heating rate of 20 K/min (second heating). After construction of a baseline the area under the peak of the second heating run is measured and the enthalpy of fusion ($\Delta Hf$) in J/g is calculated according to the corresponding ISO (11357-3 (1999)).

The Crystaf® measurements were carried out on an instrument from Polymer Char, P.O. Box 176, E-46980 Paterna, Spain, using 1,2-dichlorobenzene as solvent and the data were processed using the associated software. The Crystaf® temperature-time curve notably allows of quantitating individual peak fractions when integrated. The differential Crystaf® curve shows the modality of the short chain branching distribution. It is also possible but has not worked here to convert the Crystaf® curves obtained into CH3 groups per 1 000 carbon atoms, by using suitable calibration curves depending on the type of comonomer employed.

The density [g/cm3] was determined in accordance with ISO 1183. The vinyl group content is determined by means of IR in accordance with ASTM D 6248-98. Likewise, separately, was measured that of vinyliden groups. The dart drop impact of a film was determined by ASTM D 1709:2005 Method A on films, blown films as described, having a film thickness of 25 μm. The friction coefficient, or coefficient of sliding friction, was measured according to DIN 53375 A (1986), The haze was determined by ASTM D 1003-00 on a BYK Gardener Haze Guard Plus Device on at least 5 pieces of film 10×10 cm. The clarity of the film was determined acc. to ASTM D 1746-03 on a BYK Gardener Haze Guard Plus Device, calibrated with calibration cell 77.5, on at least 5 pieces of film 10×10 cm. The gloss at different angels was determined acc. to ASTM D 2457-03 on a gloss meter with a vacuum plate for fixing the film, on at least 5 pieces of film.

The determination of the molar mass distributions and the means Mn, Mw, Mz and Mw/Mn derived therefrom was carried out by high-temperature gel permeation chromatography using a method described in DIN 55672-1:1995-02 issue February 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, suited for use with TCB. For further details of the method, please see the method description set forth in more detail further above in the text; applying the universal calibration method based on the Mark-Houwink constants given may additionally be nicely and comprehensibly inferred in detail from ASTM-6474-99, along with further explanation on using an additional internal standard-PE for spiking a given sample during chromatography runs, after calibration.

Dynamic viscosity measurement is carried out for determining storage (G') and loss modulus (G") along with complex viscosity η*. Measurement is made by dynamic (sinusoidal) deformation of the polymer blend in a cone-and-plate rheometer such as Rheometrics RDA II Dynamic Rheometer or similar double-plate rheometer such as such as Anton-Paar MCR 300 (Anton Paar GmbH, Graz/Austria). For the measurements given below, the Anton-Paar rheometer model was used: Firstly, the sample (in granulate or powder form) is prepared for the measurement as follows: 2.2 g of the material are weighted and used to fill a moulding plate of 70×40×1 mm. The plate is placed in a press and heated up to 200° C., for 1 min. under a pressure of 20-30 bar. After the temperature of 200° C. is reached, the sample is pressed at 100 bar for 4 min. After the end of the press-time, the material is cooled to room temperature and plates are removed from the form. A visual quality control test is performed at the pressed-plates, for possible cracks, impurities or inhomogeneity. The 25 mm diameter, 0.8-1 mm thick polymer discs are cut off from the pressed form and introduced in the rheometer for the dynamic mechanical analysis (or frequency sweep) measurement.

The measurement of the elastic (G'), viscous (G") moduli and the complex viscosity as a function of frequency is performed in an Anton Paar MCR300 stress-controlled rotational rheometer. The device is equipped with a plate-plate geometry, i.e. two parallel discs of 24.975 mm radius each with a standard gap of 1.000 mm between them. For this gap ~0.5 ml of sample is loaded and heated at the measurement temperature (standard for PE: T=190° C.). The molten sample is kept at the test temperature for 5 min to achieve a homogeneous melting. Thereafter the frequency sweep begins by the instrument taking points between 0.01 and 628 rad/s logarithmically.

A periodic deformation in the linear range with a strain amplitude of 0.05 (or 5%) is applied. The frequency is varied, starting from 628.3 rad/s (or ~100 Hz) to 8.55 rad/s and for the very low frequency regime continuing from 4.631 rad/s to 0.01 rad/s (or 0.00159 Hz) with an increased rate of sampling, such as that more points are taken for the low frequency range.

The resulting shear stress amplitude and the phase lag from the applied deformation are acquired and used to calculate the moduli and the complex viscosity, as a function of frequency.

Points are chosen from the frequency range logarithmically descending from high frequencies to low and the result at each frequency point is displayed after at least 2-3 oscillations with a stable measured value are acquired.

Abbreviations in the table below:
Cat. Catalyst
T(poly) Polymerisation temperature
Mw Weight average molar mass
Mn Number average molar mass
Mz z-average molar mass
Mc critical weight of entanglement
Density Polymer density
Prod. Productivity of the catalyst in g of polymer obtained per g of catalyst used per hour
total-CH3 is the amount of CH3-groups per 100° C. including end groups
LT % low temperature weight fraction as determined from CRYSTAF®, determined from the integral curve as the fraction at T<80° C. (see FIG. 4).
HT % high temperature weight fraction as determined from CRYSTAF®, determined from the integral curve as the fraction at T>80° C. (see FIG. 4).
Preparation of the Individual Components of the Catalyst System
Bis(1-n-butyl-3-methyl-cyclopentadienyl)zirconium dichloride is commercially available from Chemtura Corporation
2,6-Bis[1-(2,4,6-trimethylphenylimino)ethyl]pyridine was prepared as in example 1 of WO 98/27124 and reacted in an analogous manner with iron(II) chloride to give 2,6-Bis[1-(2,4,6-trimethylphenylimino)ethyl]pyridine iron(II) dichloride, as likewise disclosed in WO 98/27124.
Preparation of Mixed Catalyst System on Solid Support Granula & Small Scale Polymerization:
a) Support pretreatment
Sylopol XPO-2326 A, a spray-dried silica gel from Grace, was calcinated at 600° C. for 6 hours b) Preparation of the mixed catalyst systems & batch polymerization:
b.1 Mixed Catalyst 1
2608 mg of complex 1 and 211 mg of complex 2 were dissolved in 122 ml MAO.

That solution were added to 100.6 g of the XPO2326 support above (loading: 60:4 µmol/g) at 0° C. Afterward the catalytic solution was slowly heated up to RT stirred for two hours. 196 g of catalyst were obtained. The powder had ivory colour. The loading of the complex 1 is 60 micromol/g, that of complex 2 is 4 micromol/g and the Al/(complex 1+complex 2) ratio is 90:1 mol:mol.

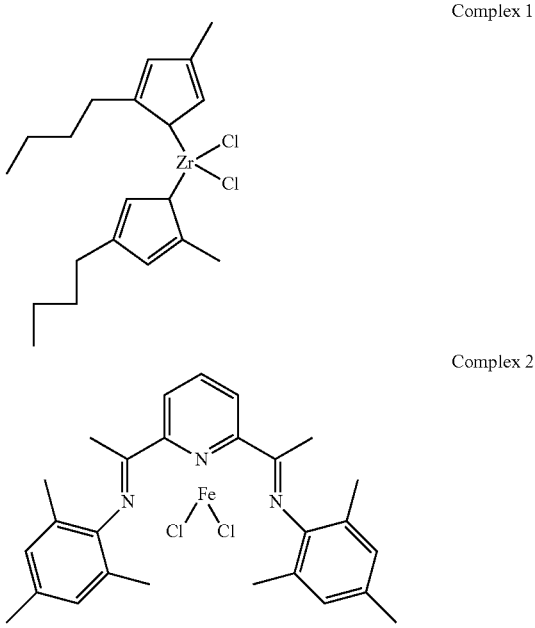

Complex 1

Complex 2

Polymerizations in a 1.7 l Autoclave:

A 1.7-l-Steelautoclave was filled under Argon at 70° C. with 100 g PE-powder (which was already dried at 80° C. for 8 hours in vacuum and stored under Argon atmosphere) having a particle size of >1 mm. 125 mg Triisobutylaluminum (TiBAl in heptane 50 mg/ml), 2 ml heptane as well as 50 mg Costelan AS 100 (Costelan in heptane 50 mg/ml) were added. After 5 minutes of stirring catalyst was added and the catalyst dosing unit was rinsed with 2 ml heptane. First the pressure was increased up to 10 bar at 70° C. with nitrogen, then a pressure of 20 bar was adjusted with ethylene and hexene fed in constant ratio to ethylene 0.1 ml/g. The pressure of 20 bar at 70° C. was kept constant for 1 hour via adding additional ethylene and hexene, fed in constant ratio to ethylene 0.1 ml/g, during the polymerization. After one hour the pressure was released. The polymer was removed from the autoclave and sieved in order to remove the polymer bed.

| Poly. run | Cat. | Cat. [mg] | hexene [ml] | PE polymer yield [g] | Prod. [g/g] | IV [dl/g] | IR: Vinyl group [1/1000C] | IR: Hexene [%] |
|---|---|---|---|---|---|---|---|---|
| 1 | 1 | 168 | 18 | 155 | 923 | 3.06 | 0.2 | 4.8 | b.2 Mixed Catalyst 2

2620 mg of metallocene complex 1 and 265 mg of Complex 2 were dissolved in 138 ml MAO.

That solution were added to 101 g of the XPO2326 support above (loading: 60:5 μmol/g) at 0° C.

Afterward the catalytic solution was slowly heated up to RT stirred for two hours.

196 g of catalyst were obtained. The powder had ivory colour. The loading of the complex 1 is 60 micromol/g, that of complex 2 4 micromol/g and the Al/(complex 1+complex 2) ratio is 90:1 mol:mol.

Polymerizations in a 1.7 l Autoclave:

A 1.7-l-Steelautoclave was filled under Argon at 70° C. with 100 g PE-powder (which was already dried at 80° C. for 8 hours in vacuum and stored under Argon atmosphere) having a particle size of >1 mm. 125 mg Triisobutylaluminum (TiBAl in heptane 50 mg/ml), 2 ml heptane as well as 50 mg Costelan AS 100 (Costelan in heptane 50 mg/ml) were added. After 5 minutes of stirring catalyst was added and the catalyst dosing unit was rinsed with 2 ml heptane. First the pressure was increased up to 10 bar at 70° C. with nitrogen, then a pressure of 20 bar was adjusted with ethylene and hexene fed in constant ratio to ethylene 0.1 ml/g. The pressure of 20 bar at 70° C. was kept constant for 1 hour via adding additional ethylene and hexene, fed in constant ratio to ethylene 0.1 ml/g, during the polymerization. After one hour the pressure was released. The polymer was removed from the autoclave and sieved in order to remove the polymer bed.

| Poly. Run | Cat. | Cat. [mg] | hexene [ml] | PE polymer yield [g] | Prod. [g/g] | IV [dl/g] | IR: Vinyl group [1/1000C] | IR: Hexene [%] |
|---|---|---|---|---|---|---|---|---|
| 2 | 2 | 126 | 36 | 298 | 2365 | 2.9 | 0.16 | 4.3 | b.3 Mixed Catalyst 3

398.9 mg of Complex 1 (1.6 mg 25 wt % solution toluene) were filled under N2 atmosphere in glass flask, then 29.8 mg of Complex 2 were add and both complexes were dissolved in 17.5 ml MAO.

That solution were added to 101 g of the XPO2326 support above (loading: 65:4 μmol/g at 0° C.

Afterward the catalytic solution was slowly heated up to RT stirred for two hours.

29.5 g of catalyst were obtained. The powder had ivory colour. The loading of the complex 1 is 65 micromol/g, that of complex 2 4 micromol/g and the Al/(complex 1+complex 2) ratio is 85:1 mol:mol.

Polymerizations in a 1.7 l Gas Phase Autoclave:

A 1.7-l-Steelautoclave was filled under Argon at 70° C. with 100 g PE-powder (which was already dried at 80° C. for 8 hours in vacuum and stored under Argon atmosphere) having a particle size of >1 mm. 200 mg Isoprenylaluminum (IPRA in heptane 50 mg/ml) as well as 50 mg Costelan AS 100 (Costelan in heptane 50 mg/ml) were added. After 5 minutes of stirring catalyst was added and the catalyst dosing unit was rinsed with 7 ml heptane. First the argon pressure was increased up to 10 bar at 70° C. then a pressure of 20 bar was adjusted with ethylene and hexene fed in constant ratio to ethylene 0.1 ml/g. The pressure of 20 bar at 70° C. was kept constant for 1 hour via adding additional ethylene and hexene, fed in constant ratio to ethylene 0.1 ml/g, during the polymerization. After one hour the pressure was released. The polymer was removed from the autoclave and sieved in order to remove the polymer bed.

| Poly. Run | Cat. | Cat. [mg] | hexene [ml] | PE polymer yield [g] | Prod. [g/g] | IV [dl/g] | IR: Vinyl group [1/1000C] | IR: Hexene [%] |
|---|---|---|---|---|---|---|---|---|
| 3 | 3 | 148 | 22 | 191 | 1291 | 2.8 | 0.12 | 4.0 |

All three polymers b.1, b.2, b.3 made by the three mixed catalyst batches can be shown to be bimodal in comonomer distribution by means of DSC.

Pilot Scale Gas Phase Polymerization

The polymers were produced in single gas phase reactor, Mixed catalysts 1 and 2 described above was used for trials A) and B) respectively. Comonomer used is 1-hexene. Nitrogen/Propane have been used as inert gas for both trials. Hydrogen was used as a molar mass regulator.

A) Catalyst 1. was run in a continuous gas phase fluidized bed reactor diameter 508 mm for stable run. Product, labeled Sample 1, was produced. Catalyst yield was >5 Kg/g (kg polymer per g catalyst). Ashes were about 0.008 g/100 g.

B) Catalyst 2 was run in continuous gas phase fluidized bed reactor diameter 219 mm continuous gas phase fluidized bed stable run. Product, labeled Sample 2 was produced. Catalyst yield was >5 Kg/g (kg polymer per g catalyst). Ashes were about 0.009 g/100 g.

Process parameters are reported below:

| Run | A | B |
|---|---|---|
| Sample | 1 | 2 |
| T [° C.] | 85 | 85 |
| P [bar] | 24 | 24 |
| C2H4 [Vol %] | 57 | 64 |
| Inerts [Vol %] | 40 | 35 |
| Propane [Vol %] | 35 | 22 |
| C6/C2 feed [Kg/Kg] | 0.11 | 0.095 |
| Hydrogen feed rate [L/h] | ~15 | ~1.6 |
| Reactor output [kg/h] | 39 | 5 |

Granulation and Film Extrusion

The polymer samples were granulated on a Kobe LCM50 extruder with screw combination E1H. The throughput was 57 kg/h. The gate position of the Kobe was adjusted to have 220° C. of melt temperature in front of the gate.

The suction pressure of the gear pump was maintained at 2.5 bar. The revolutions of the rotor were kept at 500 rpm.

2000 ppm Hostanox PAR 24 FF, 1000 ppm Irganox 1010 and 1000 ppm Zn-Stearat were added to stabilize the polyethylenes. Material properties are given in Tables 1 and 2. Table 2 describes the rheological behaviour (shear thinning) relevant to processing behaviour.

Film Blowing

The polymer was extruded into films by blown film extrusion on an Alpine HS 50S film line (Hosokawa Alpine AG, Augsburg/Germany).

The diameter of the annular die was 120 mm with a gap width of 2 mm. A barrier screw with Carlotte-mixing section and a diameter of 50 mm was used at a screw speed equivalent to an output of 40 kg/h. A Temperature profile from 190° C. to 210° C. was used. Cooling was achieved with HK300 double-lip cooler. The blow-up ratio was in the order of 1:2.5. The height of the frost line was about 250 mm. Films with a thickness of 25 μm were obtained. The optical and mechanical properties of the films are summarized in Table 3. No fluoroelastomer additive was comprised in the films manufactured from the polyethylene composition of the present invention. In contrast, the films made from the material used for the comparative example was routinely blended with fluoroelastomere (600-800 ppm of a fluoroelastomer-PPA alike e.g. Dynamar™ FX 5920A PPA, from Dyneon GmbH, Kelsterbach/Germany).

Properties of Polymer Products

The properties of the materials thus obtained are tabulated in the tables 1-3 underneath. As a comparative standard (Comparative example 1), commercially available Luflexen® 18P FAX m-LLDPE (commercially available through Basell Polyolefine GmbH, Wesseling, Germany); in the following, it will be referred to as 18P FAX for short) which is a monomodal mLLDPE product sold by the applicant of the present application and manufactured in a basically similar gas phase process using solely, as a single catalyst the same metallocene catalyst 1 as used above for preparing the polyethylene material according to the present invention.

TABLE 1

The wt.-% HDPE or % HT was obtained by Crystaf ®, from the integral curve as the fraction at T > 80° C. (see FIG. 4).

| | Sample | | |
|---|---|---|---|
| | 1 | 2 | Comparative ex. 1 |
| IV [dl/g] | 2.01 | 1.95 | 2.09 |
| GPC Mw [g/mol] | 117306 | 113220 | 124093 |
| GPC Mn [g/mol] | 26942 | 32252 | 32027 |
| GPC Mw/Mn | 4.35 | 3.51 | 3.87 |
| GPC Mz [g/mol] | 464421 | 252789 | 258945 |
| DSC Tm2 [° C.] | 121.94 | 123.04 | 118.54 |
| DSC 2nd Peak [° C.] | 106 | 105.5 | None |
| Vinyl Double bonds IR [1/1000C] | 0.27 | 0.2 | 0.14 |
| Butyl branches- C6 IR [wt %] | 7.7 | 7.4 | 6.7 |
| MFR 2.16 kg [g/10 min] | 1.1 | 1.1 | 1.0 |
| MFR 5 kg [g/10 min] | 2.9 | 3.1 | 2.5 |
| MFR 10 kg [g/10 min] | 6.7 | 7.3 | 5.7 |
| MFR 21.6 kg [g/10 min] | 20.0 | 21.7 | 16.1 |
| Density [g/cm³] | 0.9186 | 0.9202 | 0.9189 |
| (% HDPE=) % HT (Crystaf > 80° C.) | 15.4 | 20.1 | — |

TABLE 2

| frequency [rad/s] | G' [Pa] | G'' [Pa] | \|Eta*\| [Pas] | d [°] | \|G*\| [Pa] | Eta*/Eta0 |
|---|---|---|---|---|---|---|
| Sample 1 | | | | | | |
| 0.01 | (13.4) | 95.8 | 9590 | | 95.871 | 1 |
| 0.01847 | 15.6 | 168 | 9120 | 84.7 | 168.53 | 0.950991 |
| 0.034130 | 30.1 | 300 | 8830 | 84.3 | 301.34 | 0.920751 |
| 0.063050 | 60.4 | 529 | 8440 | 83.5 | 531.98 | 0.880083 |
| 0.1165 | 120 | 931 | 8060 | 82.7 | 938.76 | 0.840459 |
| 0.2152 | 229 | 1630 | 7640 | 82 | 1643.1 | 0.796663 |
| 0.3975 | 450 | 2850 | 7250 | 81 | 2883 | 0.755996 |
| 0.7344 | 870 | 4930 | 6820 | 80 | 5009.8 | 0.711157 |
| 1.357 | 1700 | 8500 | 6390 | 78.7 | 8672.9 | 0.666319 |
| 2.507 | 3390 | 14500 | 5940 | 76.8 | 14892 | 0.619395 |
| 4.631 | 6730 | 24000 | 5390 | 74.3 | 24946 | 0.562044 |
| 8.555 | 13500 | 39200 | 4840 | 71 | 41437 | 0.504692 |
| 15.8 | 26300 | 61700 | 4240 | 66.9 | 67037 | 0.442127 |
| 29.2 | 49200 | 92700 | 3590 | 62 | 104930 | 0.374348 |
| 53.94 | 86800 | 132000 | 2930 | 56.7 | 158120 | 0.305527 |
| 99.65 | 144000 | 178000 | 2300 | 51.1 | 228700 | 0.239833 |
| 184.1 | 223000 | 226000 | 1720 | 45.5 | 317410 | 0.179353 |
| 340.1 | 324000 | 272000 | 1250 | 40 | 423510 | 0.130344 |
| 628.3 | 452000 | 312000 | 874 | 34.6 | 549070 | 0.091137 Y |
| Comaprative Ex. 1 | | | | | | |
| 0.01 | 0.322 | 72.1 | 7210 | 89.7 | 72.147 | 1 |
| 0.01847 | 1.43 | 134 | 7250 | 89.4 | 133.85 | 1.00554785 |
| 0.03413 | 0.0677 | 248 | 7280 | 90 | 248.37 | 1.00970874 |
| 0.06305 | 3.14 | 459 | 7290 | 89.6 | 459.42 | 1.0110957 |
| 0.1165 | 17.9 | 840 | 7210 | 88.8 | 840.38 | 1 |
| 0.2152 | 54.3 | 1550 | 7200 | 88 | 1549.6 | 0.99861304 |
| 0.3975 | 135 | 2830 | 7120 | 87.3 | 2831 | 0.98751734 |
| 0.7344 | 381 | 5150 | 7030 | 85.8 | 5163.8 | 0.97503467 |
| 1.357 | 1030 | 9240 | 6850 | 83.7 | 9297.7 | 0.95006935 |
| 2.507 | 2600 | 16300 | 6590 | 80.9 | 16520 | 0.91400832 |
| 4.631 | 6160 | 27700 | 6130 | 77.5 | 28408 | 0.85020804 |
| 8.555 | 14100 | 45900 | 5610 | 73 | 48032 | 0.77808599 |
| 15.8 | 29700 | 72500 | 4960 | 67.7 | 78334 | 0.68793343 |
| 29.2 | 57800 | 108000 | 4200 | 61.9 | 122640 | 0.58252427 |
| 53.94 | 103000 | 152000 | 3410 | 55.8 | 183690 | 0.47295423 |

TABLE 2-continued

| frequency [rad/s] | G' [Pa] | G" [Pa] | \|Eta*\| [Pas] | d [°] | \|G*\| [Pa] | Eta*/Eta0 |
|---|---|---|---|---|---|---|
| 99.65 | 170000 | 200000 | 2640 | 49.6 | 262890 | 0.36615811 |
| 184.1 | 260000 | 249000 | 1960 | 43.7 | 360060 | 0.27184466 |
| 340.1 | 373000 | 292000 | 1390 | 38.1 | 473680 | 0.19278779 |
| 628.3 | 510000 | 327000 | 965 | 32.7 | 606010 | 0.13384189 |

The polymer of the invention can be processed without fluoroelastomers as processing aids, which are in general needed for the processing of m-LLDPE (comparative ex. 1). This feature is achieved thanks to the HDPE (% HT) component in the blend.

The improved processability can be explained by the rheological behaviour of the polymer of the invention in comparison to the comp. ex. 1, see Table 2 and the corresponding FIG. 1.

Figure 2:
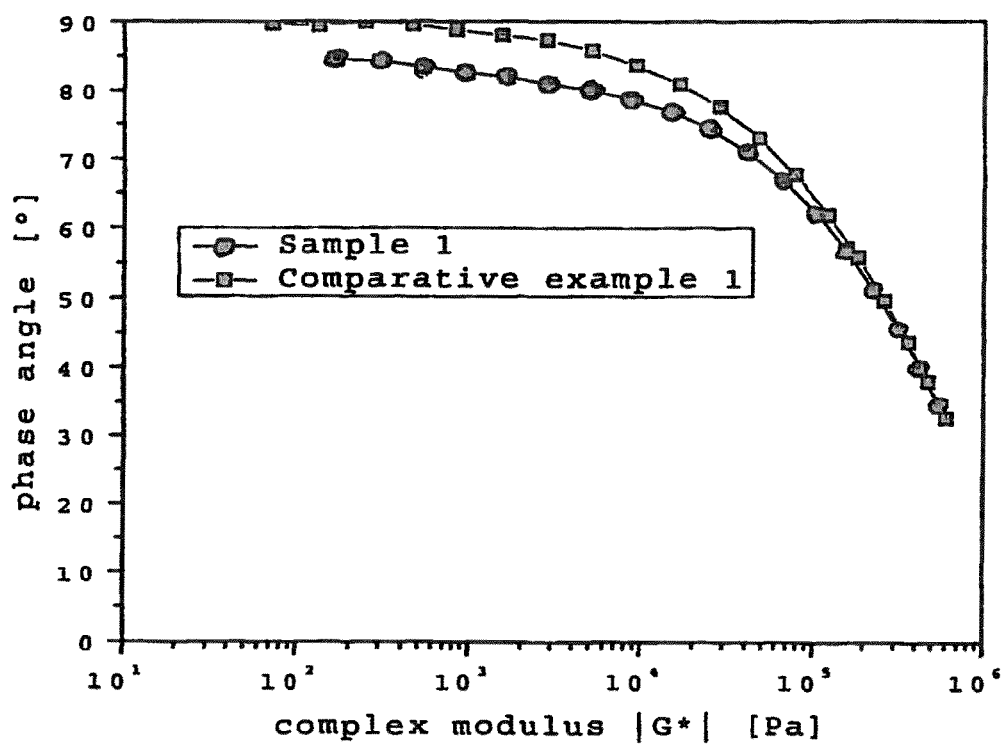
FIG. 2 shows a Van Gurp-Palmen Plot.

FIG. 1 plots the SHI* value for a batch of the material of the present invention and for the comparative standard (monomodal m-LLDPE alone, same Zirconocene catalyst as used for the invention). The product of the invention shows a better processability. The SHI* at a given rotational frequency to the viscosity at frequency=0.01 rad is always lower than that of the comparative polymer. This leads to advantages in processing. This feature is not due to the presence of LCB since a kink was not observed in the Van Gurp-Palmen Plot (Trinkel et al., 2002, supra) shown further below in FIG. 2. The good processing properties are particularly evident from the much bigger storage modulus G'(ω) for the present polymer composition at low rotational frequencies, in particular below 5 rad/s and even more below 1 rad/s in table—they are indicative of the elastic properties of the material, the polyethylene of the present invention having a 5× fold enhanced elasticity here whilst preserving the excellent dart drop values of the standard.

Figure 3:
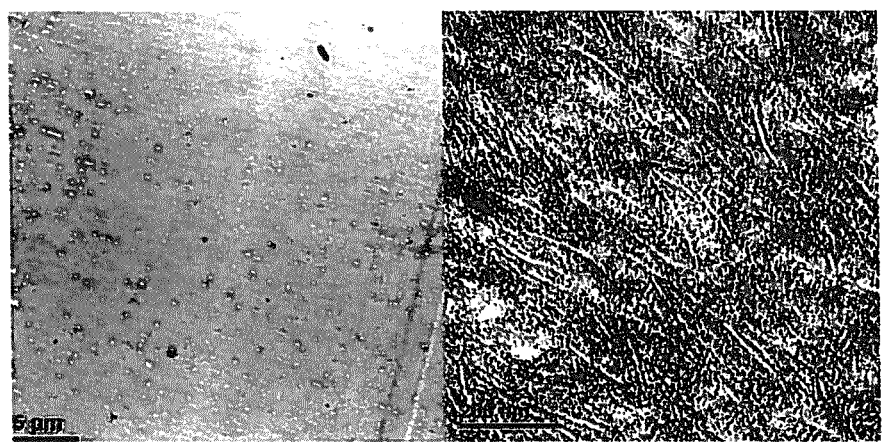
FIG. 3 displays transmissions electron microscopy (TEM) pictures of the granulated polyethylene material of the invention as used in the working examples.

FIG. 3 displays transmissions electron microscopy (TEM) pictures of the granulated polyethylene material of the invention as used in the working examples; resolution increases from left to right, as indicated in every picture by the scaling bar in the lower left corner. Left picture allows of distinguishing objects that are in the 2-3 µm range, right picture is the highest resolution allowing distinguishing objects differing by several tens of nm (~50 nm range). No spherulitic texture is observed (left picture). At higher magnification crystalline lamellae are evident (right picture). The excellent the mixing quality of the inventive product is evident.

Figure 4:
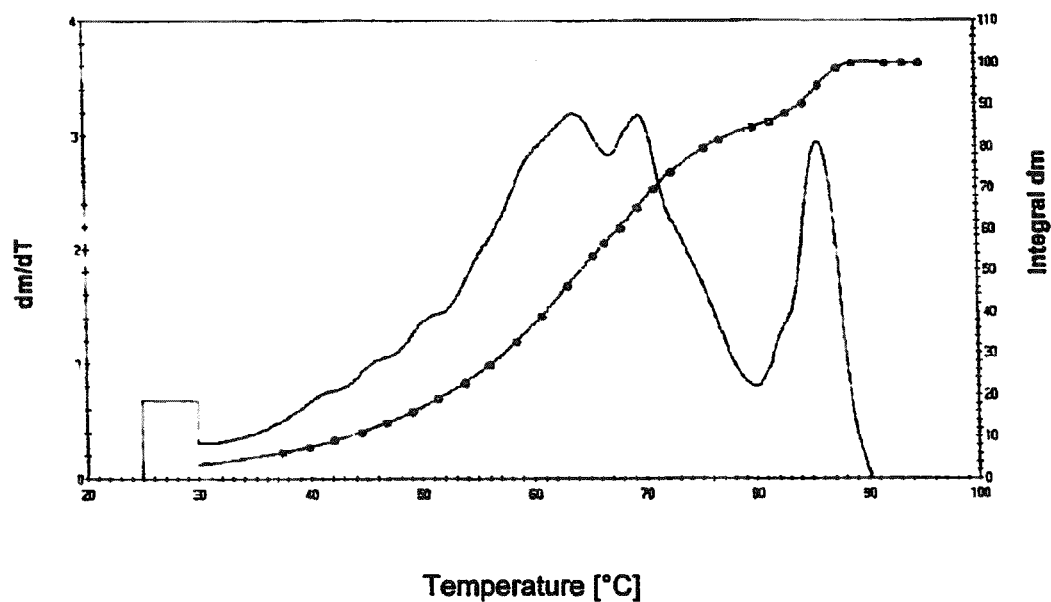
FIG. 4 shows the Crystaf diagram.

FIG. 4 shows the Crystaf® diagram of the same sample; whilst the distinction of two different, high and low temperature peak fraction is evident from the differential contour plot, peak shape may differ from DSC analysis due to solvent effect as well as does the crystallization temperature. Second graph (ball-on-stick plot) is the integrated form based on which the mass fractions of the high and temperature fractions have been calculated from according to the present invention; arbitrarily, the depression at 80° C. has been set to delimit the high from the low temperature fraction. Hence all numeric values given for the high temperature fraction are calculated from the integral of the Crystaf curve for any temperature >80° C., and vice versa.

Table 3 displays the test results for mechanical and optical tests performed on a blown film produced from the polyethylene sample 1b in comparison to the comparative, monomodal material.

TABLE 3

| Film properties: | 1 | Comp. Ex. 1 (LF 18P Fax) |
|---|---|---|
| Thickness [µm] | 25 | 25 |
| Haze [%] | 11.1 | 20.5 |
| Gloss 60° [%] | 80 | 52 |
| Friction coefficient µ (inside/inside, acc. To DIN 53375 A (1986), dimensionless) | 0.82 | 2.05 |
| Blocking number 70° C. (inside/inside) [N] | 77 | 70 |
| Dart drop impact (DDI) [g] ASTM D1709-A | >1680 | >1680 |
| Tensile strain at Break maschine/transversal direction [%] ISO 527 R-D | 499/524 | 869/933 |
| Elmendorf tear strength maschine/transversal direction [g/Layer] ISO 6383-2 | 480/760 | 339/461 |

The films made from the polyethylene composition according to the present invention have a friction coefficient according to DIN 53375 of less than 1.90, preferably of less than 1.60, more preferably of less than 1.30, most preferably of less than 1.00 and/or in the range of 1.00 to 0.30. Notably and preferably, the material of the present invention allows of attaining such low, outstanding numeric values for the friction coefficient of the films produced in the absence of fluoroelastomers. The polyethylene material and/or the films produced thereof are substantially free of friction-reducing or anti-blocking agents, notably are free or are substantially free of fluoroelastomer additives. A friction-reducing agent, otherwise also called polyolefin processing aids (PPA), within the notion of the present invention means an additive allowing of reducing the friction coefficient of a blown film. The comparative samples produced above always comprised such additives for avoiding otherwise inevitable melt fracture phenomena which would further deteriorate the mechanical and optical properties of the comparative samples, especially at film processing rates of ≥40 kg/h. This is an outstanding achievement, given that certain regulatory bodies disfavor the presence of such additives for at least some foodstuff, personal care/cosmetic and pharmaceutical uses. Further there is growing public debate and concern especially for foodstuff appliances.

Again a further added benefit of the polyethylene of the present invention having drastically improved processing properties whilst retaining a superior mechanical impact resistance is that whilst fluoroelastomer additives are compatible with most other kinds of polyolefin additives, certain materials such as pigments or anti-blocking agents have been known to negatively interfer with the fluorocarbon-elastomer processing additive in the polymer (Rudin et al., 1985, J. Plast. Film Sheet I (3): 189, Fluorocarbon Elastomer Processing Aid in Film Extrusion of LLDPEs; B. Johnson and J. Kunde, SPE ANTEC 88 Conference Proceedings XXXIV: 1425 (1988), The Influence of Polyolefin Additives on the Performance of Fluorocarbon Elastomer Process Aids). Hence improvement of the material's processing behavior without having a need for fluoroelastomer additives allows of freely choosing the other additives needed without compromising.

The invention claimed is:

1. A film comprising:
a polyethylene composition comprising a first polyethylene comprising at least one C3-C20-olefin-comonomer, wherein the polyethylene composition has a density from 0.90 to 0.935 g/cm³, a normalized shear thinning index SHI*(0.1 rad/s) less than 0.95 with SHI*(ω)=η*(ω)/η0, a molecular mass distribution from 3 to 5, and a dart drop impact value, as measured by ASTM D 1709: 2005 Method A on 25 μm blown films, of at least 1200 g.

2. The film of claim 1 wherein said polyethylene composition is at least bimodal in comonomer distribution and comprises a high temperature peak weight fraction (% HT) and a low temperature peak weight fraction (% LT) as analyzed by CRYSTAF®.

3. The film of claim 2, wherein said polyethylene composition is at least bimodal in comonomer distribution comprising a high temperature peak weight fraction (% HT) and a low temperature peak weight fraction (% LT) as analyzed by CRYSTAF® and wherein the % LT is having a CDBI of >60%.

4. The film of claim 3, wherein the % LT has a CDBI of greater than 70% and a MWD of from 1 to 4.

5. The film of claim 1, wherein the polyethylene composition has a weight average molecular weight Mw of from 50,000 up to 500,000 g/mol and/or a Mz/Mw>1.5.

6. The film of claim 2, wherein the % LT fraction is a copolymer of ethylene with C3-C20-1-olefin-copolymer comprising one or more, different comonomers.

7. The film of claim 2, wherein the % LT fraction is a LLDPE having a density of from 0.91 to 0.93 g/cm³ or is a VLDPE fraction having a density of from 0.88 to 0.91 g/cm³.

8. The film of claim 2, wherein the % LT fraction is produced by a metallocene catalyst and has a narrow MWD of less than 3.5.

9. The film of claim 1, obtained in a polymerization reaction carried out with a mixed catalyst system in a single reactor.

10. The film of claim 2, wherein said % HT fraction of the polyethylene has a density of at least 0.94 g/cm³.

11. The film of claim 2 wherein the % HT fraction of the polyethylene comprises an ethylene homopolymer subfraction and/or that the % HT fraction accounts for 5 to 30% by weight of the total weight of the polyethylene composition as determined by integral analysis from CRYSTAF®.

12. The film of claim 2, wherein the % HT fraction peaks at a crystalline melting temperature of from 120 to 124.5° C. in DSC.

13. The film of claim 2 wherein % LT fraction peaks at a crystalline melting temperature of from 101 to 107° C. in DSC.

14. The film of claim 1, wherein the polyethylene has a substantially monomodal molecular weight distribution curve as determined by GPC.

15. The film of claim 1, wherein the polyethylene has a branching of from 0.01 to 20 $CH_3$/1000 carbon atoms based on the total methyl group contents.

16. The film of claim 9, wherein the polymerization reaction is carried out with a catalytic system comprising at least two transition metal complex catalysts.

17. The film of claim 16, wherein the catalytic system comprises a first catalyst that is a metallocene catalyst.

18. The film of claim 1, wherein the polyethylene composition comprises a first polyethylene and a second polyethylene thereby forming a polymer blend comprising the first polyethylene and the second polyethylene.

19. The film of claim 18, comprising from 20 to 99% of the first polyethylene and 1 to 80% of a second polyethylene, wherein the second polyethylene is different from said first polyethylene and wherein the percentages by weight are based on the total mass of the polymer blend.

20. The film of claim 1 wherein the polyethylene composition is formed by polymerizing monomers wherein the polymerization reaction is carried out with a catalytic system comprising at least two transition metal complex catalysts in a single reactor.

21. The film of claim 20, wherein the catalytic system does not comprise a Ziegler catalyst and/or wherein a first catalyst A) is a single site catalyst which produces a first product fraction which is comprised by or is the % LT weight fraction.

22. The film of claim 21, wherein the first catalyst A) is a metallocene catalyst.

23. The film of claim 21 wherein a second catalyst B) is a non-metallocene, transition metal complex catalyst and wherein said second catalyst provides for a second product fraction, which second product fraction is comprised by or is the % HT weight fraction.

24. The film of claim 23, wherein the second catalyst B) is an iron complex catalyst component B1) having a tridentate ligand bearing at least two aryl radicals.

25. The film of claim 24, wherein each of said two aryl radicals bears a halogen and/or an alkyl substituent in the ortho-position.

26. The film of claim 1 wherein the film is produced by extruding the polyethylene composition and wherein the polyethylene composition is free or substantially free from polymer processing additive, in the continued absence of such processing additive.

27. The film of claim 26, wherein the film or moulding is free or is substantially free from melt fracture or shark-skin roughnesses on its surface.

28. The film of claim 26, wherein the polyethylene is extrudated at a processing velocity of ≥40 kg/h.

29. The film of claim 1 wherein the film is free or is substantially free from polymer processing additive.

30. The film according to claim 29, wherein the film is free or is substantially free from melt fracture or shark-skin roughnesses on its surface.

31. The film according to claim 29, further having a haze value of <15% and/or a gloss value at 60° C. of >60%.

32. The film according to claim 29, the film having a frictional index value according to DIN 53375:1998 of <1.50.

33. The film according to claim 29, having a film height or film thickness of <50 μm.

34. The film according to claim 33, having a film thickness of from 10 to 30 μm.

35. The film of claim 9 comprising a catalyst system for synthesis of the first polyethylene comprising two catalyst complexes A) and B), of formula X and XI, respectively:

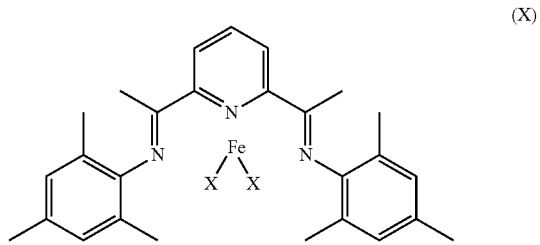

(X)

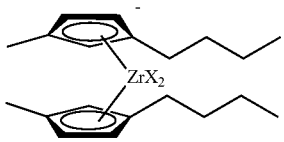

wherein X is halogen, and the catalyst system optionally further comprises at least one support D) and optionally at least one activator C).

36. The film of claim 35, wherein the molar ratio of complex X:XI=15–5:1, and that optionally the catalysts are immobilized jointly on a common support, and that optionally an activator component, is present on the support.

37. The film of claim 6 wherein the % LT fraction is a copolymer of ethylene with a C3-C20-1-olefine-copolymer comprising one or two different comonomers.

38. The film of claim 8 wherein the MWD is 1 to 3.

39. The film of claim 10 wherein the % HT fraction has a MWD>6.

40. The film of claim 13 wherein the % LT fraction peaks at a crystalline melting temperature of from 105 to 106° C.

41. The film of claim 40 wherein the % LT fraction peaks at a crystalline melting temperature of from 105 to 106° C. after tempering of the polyethylene harvested from the reactor at a temperature up to 200° C.

42. The film of claim 40 wherein the % LT fraction peaks at a crystalline melting temperature of from 105 to 106° C. after tempering of the polyethylene harvested from the reactor at a temperature up to 150° C.

43. The film of claim 16, wherein the polymerization reaction is carried out with a catalytic system comprising just two transition metal complex catalysts in a single reactor.

44. The film of claim 1 wherein the film is a blown film.

45. The film of claim 21 wherein the film is a blown film.

46. The film of claim 35 wherein X is bromide or chloride.

47. The film of claim 46 wherein X is chloride.

* * * * *